(12) United States Patent
Yanai et al.

(10) Patent No.: US 10,908,491 B2
(45) Date of Patent: Feb. 2, 2021

(54) OPTICAL FILM

(71) Applicant: FUJIFILM Corporation, Tokyo (JP)

(72) Inventors: Yujiro Yanai, Minami-ashigara (JP);
Michio Nagai, Minami-ashigara (JP);
Akira Yamamoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/447,400

(22) Filed: Jun. 20, 2019

(65) Prior Publication Data
US 2019/0302603 A1 Oct. 3, 2019

Related U.S. Application Data

(63) Continuation of application No. PCT/JP2017/044714, filed on Dec. 13, 2017.

(30) Foreign Application Priority Data

Dec. 21, 2016 (JP) .................................. 2016-247703

(51) Int. Cl.
*G03B 21/62* (2014.01)
*C09J 7/22* (2018.01)
(Continued)

(52) U.S. Cl.
CPC .............. *G03B 21/62* (2013.01); *B32B 27/08* (2013.01); *B32B 38/1808* (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 3,578,844 A * 5/1971 Churchill ................. B41M 5/28
349/21
3,597,043 A * 8/1971 Dreyer .................... G01H 9/002
349/122
(Continued)

FOREIGN PATENT DOCUMENTS

CN           105319623 A     2/2016
JP           2001-242546 A     9/2001
(Continued)

OTHER PUBLICATIONS

International Preliminary Report on Patentability and the Written Opinion of the International Searching Authority for International Application No. PCT/JP2017/044714, dated Jul. 4, 2019, with English translation.

(Continued)

*Primary Examiner* — Clayton E. LaBalle
*Assistant Examiner* — Kevin C Butler
(74) *Attorney, Agent, or Firm* — Birch, Stewart, Kolasch & Birch, LLP

(57) ABSTRACT

Provided is an optical film having high contrast and excellent visibility. The optical film includes: a transparent screen; and a transparent reflecting layer that is disposed on one main surface of the transparent screen, in which in the transparent screen, a ratio $T_{15}/T_{30}$ of a light amount $T_{15}$ of transmitted light at an angle of 15 degrees with respect to a normal direction of the main surface to a light amount $T_{30}$ of transmitted light at an angle of 30 degrees with respect to the normal direction of the main surface is 2.0 or higher, and the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface is 2.0 or lower.

9 Claims, 6 Drawing Sheets

(51) Int. Cl.

| | | |
|---|---|---|
| *C09J 7/38* | (2018.01) | |
| *B32B 27/08* | (2006.01) | |
| *B32B 38/18* | (2006.01) | |
| *C08F 220/10* | (2006.01) | |
| *G02B 5/02* | (2006.01) | |
| *H04N 5/74* | (2006.01) | |
| *C08J 7/04* | (2020.01) | |
| *G03B 21/56* | (2006.01) | |
| *G03B 21/58* | (2014.01) | |
| *G03B 21/60* | (2014.01) | |

(52) U.S. Cl.
 CPC ........... *C08F 220/10* (2013.01); *C08J 7/0427* (2020.01); *C09J 7/22* (2018.01); *C09J 7/38* (2018.01); *G02B 5/02* (2013.01); *G03B 21/56* (2013.01); *G03B 21/58* (2013.01); *G03B 21/60* (2013.01); *H04N 5/74* (2013.01); *C08J 2433/00* (2013.01)

(58) Field of Classification Search
 USPC .......................................... 359/443
 See application file for complete search history.

(56) References Cited

U.S. PATENT DOCUMENTS

| | | | | |
|---|---|---|---|---|
| 3,600,060 | A * | 8/1971 | Churchill | B41M 5/281 349/21 |
| 5,193,015 | A * | 3/1993 | Shanks | G02B 5/3016 348/E9.025 |
| 6,624,937 | B2 * | 9/2003 | Kashima | G02B 5/3008 349/57 |
| 7,161,743 | B2 * | 1/2007 | Nishida | G02B 5/0226 359/443 |
| 2004/0252373 | A1 * | 12/2004 | Umeya | G02B 5/3016 359/449 |
| 2005/0030617 | A1 * | 2/2005 | Umeya | G03B 21/56 359/443 |
| 2005/0122583 | A1 * | 6/2005 | Umeya | G03B 21/56 359/449 |
| 2015/0138628 | A1 * | 5/2015 | Guiset | G03B 21/62 359/318 |
| 2016/0033693 | A1 | 2/2016 | Son et al. | |
| 2016/0139497 | A1 | 5/2016 | Usukura et al. | |
| 2016/0318845 | A1 * | 11/2016 | Katoh | C08F 22/26 |
| 2017/0343830 | A1 * | 11/2017 | Nagai | G02B 27/288 |
| 2017/0351009 | A1 * | 12/2017 | Matsuo | G03B 21/60 |
| 2018/0052264 | A1 * | 2/2018 | Saitoh | G02B 5/26 |
| 2018/0074315 | A1 * | 3/2018 | Yanai | G02F 1/13718 |
| 2018/0107106 | A1 * | 4/2018 | Ichihara | G02B 30/25 |
| 2019/0064411 | A1 * | 2/2019 | Yanai | G02F 1/13 |
| 2019/0079380 | A1 * | 3/2019 | Yanai | G02B 5/3016 |
| 2019/0094432 | A1 * | 3/2019 | Yanai | G02B 5/0278 |
| 2019/0302603 | A1 * | 10/2019 | Yanai | C09J 7/22 |

FOREIGN PATENT DOCUMENTS

| | | |
|---|---|---|
| JP | 2002-258408 A | 9/2002 |
| JP | 2014-71250 A | 4/2014 |
| JP | 2015-212800 A | 11/2015 |
| WO | WO 2014/188978 A1 | 11/2014 |
| WO | WO 2016/104112 A1 | 6/2016 |
| WO | WO 2016/133223 A1 | 8/2016 |
| WO | WO-2016133223 A1 * | 8/2016 ............. G02B 5/201 |
| WO | WO 2016/194327 A1 | 12/2016 |
| WO | WO-2016194327 A1 * | 12/2016 ......... G02F 1/13718 |

OTHER PUBLICATIONS

International Search Report for International Application No. PCT/JP2017/044714, dated Mar. 6, 2018, with English translation.
Japanese Office Action for corresponding Japanese Application No. 2018-557707, dated Feb. 12, 2020, with English translation.
Office Action dated Sep. 17, 2020 in corresponding Chinese Patent Application No. 201780079438.5, with English translation.

* cited by examiner

OPTICAL FILM

CROSS-REFERENCE TO RELATED APPLICATIONS

This application is a Continuation of PCT International Application No. PCT/JP2017/044714 filed on Dec. 13, 2017, which claims priority under 35 U.S.C. § 119(a) to Japanese Patent Application No. 2016-247703 filed on Dec. 21, 2016. The above application is hereby expressly incorporated by reference, in its entirety, into the present application.

BACKGROUND OF THE INVENTION

1. Field of the Invention

The present invention relates to an optical film.

2. Description of the Related Art

Recently, as one display device, a transparent screen that displays video light to be visually recognizable as a video to an observer present on a projector side by reflecting light incident from a front surface side and allowing transmission of light incident from a back surface side is disclosed.

For example, JP2015-212800A describes a transparent screen that includes a resin layer including inorganic particles. The transparent screen can allow a projected image and a sight on a rear surface side to be visually recognizable at the same time by reflecting light incident from a front surface side of the screen and allowing transmission of light incident from a back surface side of the screen.

SUMMARY OF THE INVENTION

In a case where the transparent screen is used in a bright room environment where external light is present, projector light and the external light overlap each other such that there is a problem in that the contrast of an image projected from a projector decreases and the visibility of the image deteriorates.

The present invention has been made in consideration of the above-described circumstances, and an object thereof is to provide an optical film having high contrast and excellent visibility.

The present inventors conducted a thorough investigation on the problems of the related art and found that the above-described object can be achieved with an optical film comprising: a transparent screen; and a transparent reflecting layer that is disposed on one main surface of the transparent screen, in which in the transparent screen, a ratio $T_{15}/T_{30}$ of a light amount $T_{15}$ of transmitted light at an angle of 15 degrees with respect to a normal direction of the main surface to a light amount $T_{30}$ of transmitted light at an angle of 30 degrees with respect to the normal direction of the main surface is 2.0 or higher, and a ratio $R_{15}/R_{30}$ of a light amount $R_{15}$ of reflected light at an angle of 15 degrees with respect to the normal direction of the main surface to a light amount $R_{30}$ of reflected light at an angle of 30 degrees with respect to the normal direction of the main surface is 2.0 or lower.

That is, the present inventors found that the objects can be achieved with the following configurations.

(1) An optical film comprising:
a transparent screen; and
a transparent reflecting layer that is disposed on one main surface of the transparent screen,
in which in the transparent screen, a ratio $T_{15}/T_{30}$ of a light amount $T_{15}$ of transmitted light at an angle of 15 degrees with respect to a normal direction of the main surface to a light amount $T_{30}$ of transmitted light at an angle of 30 degrees with respect to the normal direction of the main surface is 2.0 or higher, and
a ratio $R_{15}/R_{30}$ of a light amount $R_{15}$ of reflected light at an angle of 15 degrees with respect to the normal direction of the main surface to a light amount $R_{30}$ of reflected light at an angle of 30 degrees with respect to the normal direction of the main surface is 2.0 or lower.

(2) The optical film according to (1),
in which a reflectivity of the transparent reflecting layer is 20% to 50%.

(3) The optical film according to (1) or (2),
in which the transparent screen includes a plurality of cholesteric liquid crystal dots.

(4) The optical film according to (1) or (2),
in which the transparent screen includes a resin layer in which a plurality of particles are dispersed in a resin binder,
a particle size of the particles is 0.3 μm to 10 μm, and
a volume fraction of a content of the particles in the resin layer is 50% or lower.

(5) The optical film according to (4),
in which a ratio of a refractive index of the particles to a refractive index of the resin binder is 0.91 to 1.5.

(6) The optical film according to any one of (1) to (5),
in which the transparent reflecting layer includes a cholesteric liquid crystal layer.

(7) The optical film according to (6),
in which the transparent reflecting layer includes a λ/4 plate.

(8) The optical film according to any one of (1) to (5),
in which the transparent reflecting layer is formed of a dielectric multi-layer film.

(9) The optical film according to (8),
in which the dielectric multi-layer film has linear polarization properties.

(10) The optical film according to any one of (1) to (5),
in which the transparent reflecting layer is formed of a wire grid polarizing plate.

(11) The optical film according to any one of (1) to (5),
in which the transparent reflecting layer is formed of a half mirror.

(12) The optical film according to any one of (1) to (11), which is laminated on at
least a part of a window glass of a vehicle.

(13) The optical film according to (12), which reflects light emitted from a projector provided in the vehicle.

According to the present invention, an optical film having high contrast and excellent visibility can be provided.

DESCRIPTION OF THE PREFERRED EMBODIMENTS

Figure 1:
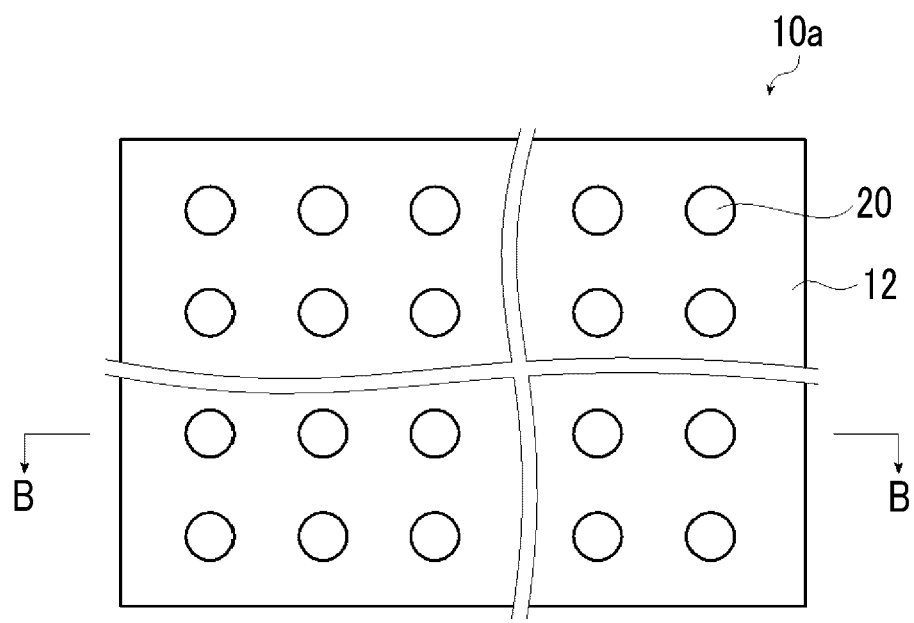
FIG. 1 is a front view schematically showing an example of an optical film according to the present invention.

Hereinafter, the details of an optical film according to the present invention will be described. In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

Visible light refers to light having a wavelength which can be observed by human eyes among electromagnetic waves and refers to light in a wavelength range of 380 nm to 780 nm. Invisible light refers to light in a wavelength range of shorter than 380 nm or longer than 780 nm.

In addition, although not limited thereto, in visible light, light in a wavelength range of 420 nm to 490 nm refers to blue light, light in a wavelength range of 495 nm to 570 nm refers to green light, and light in a wavelength range of 620 nm to 750 nm refers to red light.

Among infrared light rays, near infrared light refers to an electromagnetic wave in a wavelength range of 780 nm to 2500 nm. Ultraviolet light refers to light in a wavelength range of 10 to 380 nm.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Direct Transmittance of Natural Light)×100%

The diffuse transmittance refers to a value calculated by subtracting the direct transmittance from a total transmittance which is obtained using a spectrophotometer and an integrating sphere unit. The direct transmittance refers to a transmittance at 0° in a case where a value measured using an integrating sphere unit is used. That is, low haze represents that the amount of directly transmitted light in the total amount of transmitted light is large.

The refractive index refers to a refractive index with respect to light having a wavelength of 589.3 nm.

In this specification, a selective reflection wavelength refers to an average value of two wavelengths at which, in a case where a minimum value of a transmittance of a target object (member) is represented by Tmin (%), a half value transmittance: T½(%) represented by the following expression is exhibited.

Expression for obtaining Half Value Transmittance: T½=100−(100−Tmin)÷2

In addition, selective reflection wavelengths of a plurality of objects being "equal" does not represent that the selective reflection wavelengths are exactly equal, and error is allowed in a range where there are no optical effects. Specifically, selective reflection wavelengths of a plurality of objects being "equal" represents a difference between the selective reflection wavelengths of the respective objects is 20 nm or less, and this difference is preferably 15 nm or less and more preferably 10 nm or less.

The optical film according to the present invention includes:

a transparent screen; and a transparent reflecting layer that is disposed on one main surface of the transparent screen, in which in the transparent screen, a ratio $T_{15}/T_{30}$ of a light amount $T_{15}$ of transmitted light at an angle of 15 degrees with respect to a normal direction of the main surface to a light amount $T_{30}$ of transmitted light at an angle of 30 degrees with respect to the normal direction of the main surface is 2.0 or higher, and a ratio $R_{15}/R_{30}$ of a light amount $R_{15}$ of reflected light at an angle of 15 degrees with respect to the normal direction of the main surface to a light amount $R_{30}$ of reflected light at an angle of 30 degrees with respect to the normal direction of the main surface is 2.0 or lower.

<Optical Film>

Figure 2:
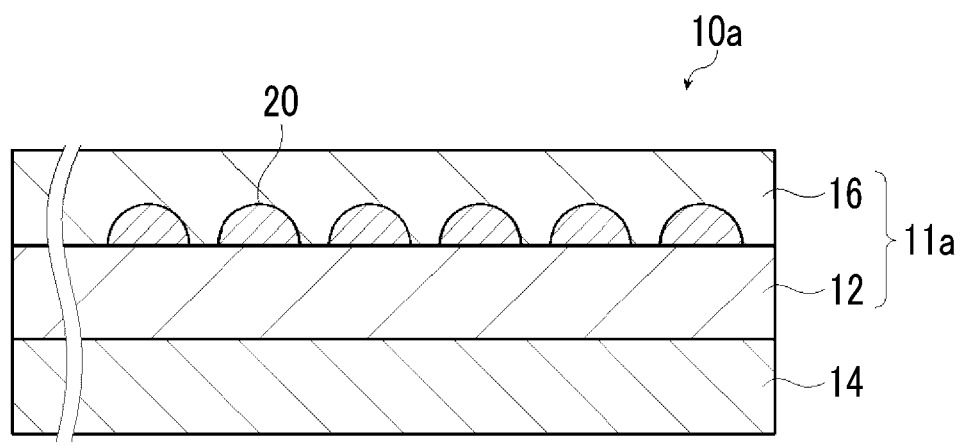
FIG. 2 is a cross-sectional view taken along line B-B of FIG. 1.

Hereinafter, an example of a preferable embodiment of the optical film according to the present invention will be described with reference to the drawings. FIG. 1 is a front view schematically showing an example of the optical film according to the embodiment of the present invention. FIG. 2 is a cross-sectional view taken along line B-B of FIG. 1.

The drawing in the present invention is a schematic diagram, and a thickness relationship or a positional relationship between respective layers do not necessarily match the actual ones. The same shall be applied to the following drawings.

As shown in FIGS. 1 and 2, an optical film 10a includes: a transparent screen 11a; and a transparent reflecting layer 14 that is laminated on a back surface side of the transparent screen 11a.

In addition, although not shown in the drawing, the transparent screen 11a and the transparent reflecting layer 14 are bonded to each other using a bonding layer provided therebetween.

In the present invention, as the bonding layer, any bonding layer formed of one of well-known various materials can be used as long as it is a material that can bond a plate-shaped material (sheet-like material) as a target. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-like material in an optical device or an optical element, for example, an optical clear adhesive (OCA), an optically transparent double-sided tape, or an ultraviolet curable resin.

Here, in a case where light is vertically incident on the main surface of the transparent screen of the optical film according to the embodiment of the present invention, the ratio $T_{15}/T_{30}$ of the light amount $T_{15}$ of transmitted light at an angle of 15 degrees with respect to the normal direction of the main surface to the light amount $T_{30}$ of transmitted light at an angle of 30 degrees with respect to the normal direction of the main surface is 2.0 or higher, and the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface is 2.0 or lower.

With the configuration in which the transparent reflecting layer is laminated on the transparent screen having the above-described characteristics, the brightness of an image projected to the transparent screen can be increased. Even in a case where the optical film is used in a bright room environment where external light is present, a decrease in contrast can be suppressed, and the visibility of an image can be improved.

This point will be described below.

<<Transparent Screen>>

As shown in FIGS. 1 and 2, the transparent screen 11a includes: a substrate 12 that allows transmission of light; a plurality of liquid crystal dots 20 that are formed on one main surface of the substrate 12; and an overcoat layer 16 that embeds the liquid crystal dots 20 and is formed on a surface where the liquid crystal dots 20 are formed.

In FIG. 1, the overcoat layer 16 is not shown.

In addition, video light is incident on the surface where the liquid crystal dots 20 are formed. That is, the surface where the liquid crystal dots 20 are formed is a front surface, and the opposite surface is a back surface. Accordingly, the transparent reflecting layer 14 is laminated on a surface of the substrate 12 opposite to the surface where the liquid crystal dots 20 are formed.

The liquid crystal dot (hereinafter, also referred to as "dot") 20 is formed of a liquid crystal material having a cholesteric structure and has wavelength selective reflecting properties. The transparent screen 11a includes a plurality of dots 20. Video light incident on the surface of the transparent screen 11a where a plurality of dots 20 are formed is selectively reflected from the surfaces of the dots 20 based on a wavelength range of the video light. Here, the dot 20 is formed in a substantially hemispherical shape. Therefore, an incidence angle of the incident video light changes depending on the positions of the surfaces of the dots 20, and thus the video light is reflected in various directions, and an effect of widening the viewing angle can be exhibited.

The cholesteric structure of the liquid crystal material forming each of the dots 20 has a stripe pattern including bright portions and dark portions in a cross-sectional view of the dot in case of being observed with a scanning electron microscope. The dot includes a portion having a height which continuously increases to a maximum height in a direction moving from an end portion of the dot to the center of the dot. In this portion, an angle between a normal line of a line, which is formed using a first dark portion from a surface of the dot opposite to the substrate, and the surface of the dot is preferably in a range of 70° to 90°.

This point will be described below.

Here, in the transparent screen 11a shown in FIGS. 1 and 2, in a preferable aspect, the overcoat layer 16 is formed to cover the dots 20. However, the present invention is not limited to this example, and the dots 20 may be exposed without providing the overcoat layer.

In the present invention, it is preferable that the overcoat layer 16 is provided as in the transparent screen 11a shown in FIG. 2 from the viewpoint that the transparency can be further improved by eliminating the unevenness of the surfaces of the dots 20.

In addition, in a case where the overcoat layer 16 is formed, it is preferable that a difference between the refractive index of the overcoat layer 16 and the refractive index of the dots 20 is as low as possible from the viewpoints that reflection from an interface between the overcoat layer 16 and the dots 20 can be suppressed and the transparency can be further improved. The difference is preferably 0.10 or lower, more preferably 0.04 or lower, and still more preferably 0.02 or lower.

In addition, all the dots 20 that are formed may reflect light in the same wavelength range, but the present invention is not limited thereto. The dots 20 may include two or more kinds of dots that reflect light components in different wavelength ranges.

For example, the dots 20 may include red dots that reflect red light in a wavelength range of 610 nm to 690 nm, green dots that reflect green light in a wavelength range of 515 nm to 585 nm, and blue dots that reflect blue light in a wavelength range of 420 nm to 480 nm.

This way, it is preferable that the dots that reflect red light, the dots that reflect green light, and the dots that reflect blue light, for example, from the viewpoint that red light, green light, and blue light of video light incident on the front surface can be reflected and a video projected to the transparent screen can be displayed in color and the viewpoint that video light emitted from a video device such as a projector can be used even though the light is red light, green light, or blue light.

The present invention is not limited to the configuration including the dots that reflect red light, the dots that reflect green light, and the dots that reflect blue light, and the dots may further include dots that reflect light in a wavelength range other than the above-described wavelength ranges.

In addition, the dots that reflect red light, the dots that reflect green light, and the dots that reflect blue light are not particularly limited as long as they reflect light in the above-described respective wavelength ranges, and peak wavelengths of reflected waves may be outside of the above-described respective wavelength ranges.

In addition, the present invention is not limited to the configuration including the three kinds of dots that reflect red light, green light, and blue light, respectively. For example, the dots may include two kinds including dots that reflect red light and dots that reflect blue light. Alternatively, the dots may include four or kinds including dots that reflect light in another wavelength range in addition to the three kinds of dots that reflect red light, green light, and blue light, respectively. In addition, by adjusting the reflection wavelengths of the dots according to the wavelength of video light emitted from a video device such as a projector, only the video light can be efficiently reflected, transmission of light having a wavelength that is not included in the video light can be allowed, and the transparency can be further improved. Further, by narrowing the wavelength of video light emitted from a video device such as a projector and widening the reflection band of the dots of the transparent screen, the effect can be further improved.

In addition, in a case where two or more kinds of dots that reflect light components in different wavelength ranges are provided, the arrangement of the dots is not particularly limited. For example, the dots may be arranged alternately or randomly.

Here, reflected light of the cholesteric structure of the liquid crystal material forming the dot is circularly polarized light. That is, the cholesteric structure of the liquid crystal material selectively reflects one of right circularly polarized light or left circularly polarized light and allows transmission of the other one.

Accordingly, in the present invention, all the dots 20 that are formed may reflect the same circularly polarized light, or may include right polarization dots that reflect right circularly polarized light and left polarization dots that reflect left circularly polarized light.

It is preferable that the dots 20 include the dots that reflect right circularly polarized light and the dots that reflect left circularly polarized light, for example, from the viewpoint that right circularly polarized light and left circularly polarized light of video light can be reflected such that the reflectivity can be improved, the viewpoint that stereoscopic vision (so-called 3D display) can be implemented by displaying an image for the left eye or the right eye of an observer for each of right circularly polarized light or left circularly polarized light of video light, and from the viewpoint that video light emitted from a video device such as a projector can be used even though the vide light is right circularly polarized light or left circularly polarized light.

In addition, in a case where the cholesteric structure of the liquid crystal material selectively reflects one of right circularly polarized light or left circularly polarized light and allows transmission of the other one, video light emitted from a video device such as a projector is set as right circularly polarized light or left circularly polarized light and a transparent screen including dots that reflect circularly polarized light corresponding to the video light is used in combination such that only the video light can be efficiently reflected, transmission of circularly polarized light that is not included in the video light can be allowed, and the transparency can be further improved.

Circularly polarized light selective reflecting properties regarding whether or not the reflected light of the cholesteric structure is right circularly polarized light or left circularly polarized light is determined depending on a helical twisting direction of the cholesteric structure. Regarding the selective reflection by the cholesteric liquid crystals, in a case where the helical twisting direction of the cholesteric liquid crystals is right, right circularly polarized light is reflected, and in a case where the helical twisting direction of the cholesteric liquid crystals is left, left circularly polarized light is reflected.

Further, two or more dots that reflect light components in different wavelength ranges may be provided and dots that reflect right circularly polarized light and dots that reflect left circularly polarized light may be provided as the dots that reflect light in the respective wavelength ranges.

In addition, the present invention is not limited to the configuration in which each of the dots reflects light in one wavelength range, and one dot may be configured to reflect light components in a plurality of wavelength ranges. That is, one dot may be configured to include two or more regions where light components in different wavelength ranges are reflected.

For example, one dot may include a layer that reflects red light, a layer that reflects green light, and a layer that reflects blue light. As a result, red light, green light, and blue light of incident video light can be reflected by one dot.

Accordingly, a video projected to the transparent screen can be displayed in color. In addition, video light emitted from a video device such as a projector can be used even though the video light is red light, green light, or blue light. In addition, red light, green light, and blue light of video light can be reflected, and the reflectivity can be improved.

However, the present invention is not limited to the configuration in which one dot includes three layers that reflect light components in different wavelength ranges. For example, one dot may include two or more layers or four or more layers that reflect light components in different wavelength ranges.

In addition, the present invention is not limited to the configuration in which each of the dots reflects any one of right circularly polarized light or left circularly polarized light, and one dot may be configured to reflect both right circularly polarized light and left circularly polarized light. That is, one dot may have a region that reflects right circularly polarized light and a region that reflects left circularly polarized light.

As a result, right circularly polarized light and left circularly polarized light of incident video light can be reflected by one dot.

Further, each of the dots may reflect light components in a plurality of wavelength ranges and may reflect right circularly polarized light and left circularly polarized light in the respective wavelength ranges. That is, one dot may have regions that reflect light components in different wavelength ranges and may have a region that reflects right circularly polarized light in the respective wavelength ranges and a region that reflects left circularly polarized light in the respective wavelength ranges.

Figure 3:
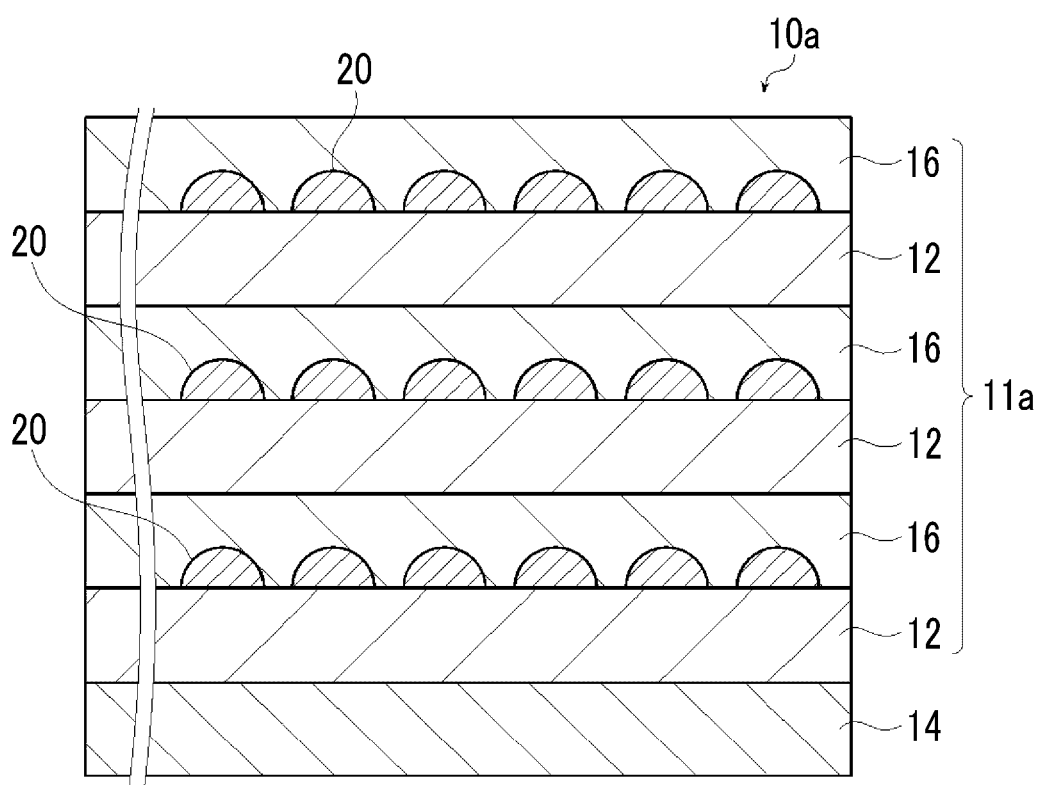
FIG. 3 is a cross-sectional view schematically showing another example of the optical film according to the present invention.

In addition, the transparent screen may be formed by laminating a plurality of members through an adhesive layer, each of the members being obtained by forming dots on the substrate surface and covering the dots with the overcoat layer (refer to FIG. 3). In addition, by shifting the positions of the dots in a front view during the lamination of the members, the area ratio in a front view can be efficiently improved. In addition, the dots included in each of the layers may be any dots described above regarding the design of the reflection wavelength or the reflected circularly polarized light. In particular, it is preferable that a member including dots that reflect blue light, a member including dots that reflect green light, and a member including dots that reflect red light are laminated in this order from a light incidence side. The reason for this is to suppress a phenomenon in which light reflected from a layer distant from a light source is reflected again from a layer close to the light source to return to a viewer side.

In addition, the overcoat layer may also function as the adhesive layer. In addition, a member in which dots are formed on both surfaces of the substrate may be laminated.

<<Transparent Reflecting Layer>>

The transparent reflecting layer 14 is a layer having reflecting properties and transparency that reflect a part of light and allows transmission of another part of the light.

In this specification, "having reflecting properties" represents that, specifically, the reflectivity of non-polarized light having a wavelength of 380 nm to 780 nm is 20% or higher.

In this specification, "having transparency" represents that, specifically, the transmittance (total transmittance) of non-polarized light having a wavelength of 380 nm to 780 nm is 50% or higher.

In the present invention, from the viewpoint of further improving the contrast, the reflectivity of the transparent reflecting layer 14 is preferably 20% to 50% and more preferably 25% to 35%.

In addition, from the viewpoint of improving the visibility of a sight on a rear surface side, the transmittance of the transparent reflecting layer 14 is preferably 50% to 80% and more preferably 65% to 75%.

The reflectivity of the transparent reflecting layer refers to the proportion of light (reflected light) reflected to the normal direction in light (incidence light) incident from the normal direction, and the transmittance of the transparent reflecting layer refers to the proportion of light (transmitted light) transmitted to a back surface side in the light (incidence light) incident from the normal direction.

The configuration of the transparent reflecting layer 14 is not particularly limited as long as it has reflecting properties and transparency, and a well-known reflecting layer of the related art having transparency can be used.

Specifically, a reflecting layer including a cholesteric liquid crystal layer, a dielectric multi-layer film, a wire grid polarizing plate, a half mirror, or the like can be used.

(Reflecting Layer Including Cholesteric Liquid Crystal Layer)

The reflecting layer including a cholesteric liquid crystal layer is formed of a liquid crystal material having a cholesteric structure, has wavelength selective reflecting properties, and selectively reflects one of right circularly polarized light or left circularly polarized light and allows transmission of the other one. That is, the reflecting layer including a cholesteric liquid crystal layer has selective reflection wavelength in a visible range and selectively reflects one of right circularly polarized light or left circularly polarized light in the selective reflection wavelength and allows transmission of the other one. As a result, the reflecting layer including a cholesteric liquid crystal layer has reflecting properties and transparency.

The cholesteric liquid crystal layer is obtained by curing a polymerizable cholesteric liquid crystal composition as a cholesteric liquid crystalline phase.

The selective reflection wavelength of the cholesteric liquid crystalline phase depends on a pitch of a helical structure in the cholesteric liquid crystalline phase. The selective reflection wavelength can be adjusted by adjusting the pitch of the helical structure. Regarding the pitch of the cholesteric liquid crystalline phase, a desired pitch can be obtained by adjusting the kind of a chiral agent which is used in combination with a polymerizable liquid crystal compound and the concentration of the chiral agent added. In addition, whether or not the reflected light is right circularly polarized light or left circularly polarized light is determined depending on a helical twisting direction of the cholesteric liquid crystalline phase.

The material, configuration, and the like of the cholesteric liquid crystal layer are the same as those of a liquid crystal dot described below except that the cholesteric liquid crystal layer is formed in a flat layer shape.

The cholesteric liquid crystal layer may be formed on a support such as polyethylene terephthalate (PET), triacetyl cellulose (TAC), or acryl, may be bonded to the transparent screen, or may be formed on the substrate of the transparent screen.

In addition, the reflecting layer including a cholesteric liquid crystal layer may include a plurality of cholesteric liquid crystal layers that are different from each other in at least one of selective reflection wavelength or polarization direction.

In addition, the transmittance or the reflectivity can be improved by optionally providing a $\lambda/4$ plate to convert reflected circularly polarized light into linearly polarized light or to convert incident linearly polarized light into circularly polarized light.

(Dielectric Multi-Layer Film)

The dielectric multi-layer film may be a well-known dielectric multi-layer film in which a plurality of dielectric films formed of aluminum oxide, magnesium fluoride, zirconium oxide, silicon oxide, or the like are laminated. The dielectric multi-layer film has a configuration in which a dielectric film having a high refractive index and a dielectric film having a low refractive index are alternately laminated. By adjusting the layer configuration of the dielectric films, transmission of light in a desired wavelength range can be allowed, and light in another wavelength range can be reflected.

As the dielectric multi-layer film, a commercially available product can be used, and examples of the commercially available product include H256 (manufactured by Shibuya Optical Co., Ltd.).

(Wire Grid Polarizing Plate)

The wire grid polarizing plate is a polarizer that allows transmission of a part of polarized light and reflects the other part of the polarized light due to birefringence of thin metal wires.

The wire grid polarizing plate has a structure in which metal wires are periodically arranged, and is used as a polarizer mainly in a terahertz band. Since the wire grid functions as a polarizer, it is necessary that a wire interval is sufficiently smaller than a wavelength of incident electromagnetic waves.

In the wire grid polarizing plate, the metal wires are arranged at regular intervals. A polarized light component in a polarization direction parallel to a longitudinal direction of the metal wires is reflected from the wire grid polarizing plate, and a polarized light component in a polarization direction perpendicular to the longitudinal direction transmits through the wire grid polarizing plate.

As the wire grid polarizing plate, a commercially available product can be used, and examples of the commercially available product include a wire grid polarizing filter 50×50, NT46-636 (manufactured by Edumund Optics Inc.).

(Half Mirror)

The half mirror is a well-known half mirror in which a metal deposited film formed of aluminum, silver, or the like is formed on a support such as a plastic film. The proportions of the reflectivity and the transmittance of the half mirror can be adjusted by adjusting the thickness of the metal deposited film.

Here, it is preferable that the transparent reflecting layer has a function of reflecting S waves (polarized light in which an electric field component is perpendicular to an incident surface).

External light that is reflected from an external area and then is incident on the optical film includes S waves as a major component. Therefore, by the transparent reflecting layer reflecting S waves, external light incident on the optical film can be shielded. As a result, a decrease in the contrast of an image projected to the optical film can be suppressed.

In the case of the reflecting layer including a cholesteric liquid crystal layer, it is necessary that the reflecting layer further includes a λ/4 plate in order to reflect S waves. With the configuration in which the reflecting layer further includes a λ/4 plate, S waves as linearly polarized light can be converted into circularly polarized light, and the converted circularly polarized light can be reflected from the cholesteric liquid crystal layer.

In addition, in the case of the dielectric multi-layer film, it is necessary that the dielectric multi-layer film has linear polarization properties.

In addition, the wire grid polarizing plate reflects one polarized light and allows transmission of another polarized light, and thus can reflect S waves.

Here, as described above, in a case where light is vertically incident on the main surface of the transparent screen of the optical film according to the embodiment of the present invention, the ratio $T_{15}/T_{30}$ of the light amount $T_{15}$ of transmitted light at an angle of 15 degrees with respect to the normal direction of the main surface to the light amount $T_{30}$ of transmitted light at an angle of 30 degrees with respect to the normal direction of the main surface is 2.0 or higher, the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface is 2.0 or lower, and the transparent reflecting layer is laminated on the transparent screen. As a result, the brightness of an image projected to the transparent screen can be increased. Even in a case where the optical film is used in a bright room environment where external light is present, a decrease in contrast can be suppressed, and the visibility of an image can be improved.

First, the contrast of an image projected to the transparent screen (optical film) in a bright room environment where external light is present will be described using FIGS. 4 and 5.

In general, the contrast is represented by a ratio between a maximum value and a minimum value of the brightness in the image. The maximum value of the brightness refers to a brightness in a white display, and thus will be referred to as "white brightness". The minimum value of the brightness refers to a brightness in a black display, and thus will be referred to as "black brightness". In addition, light having the maximum brightness projected from the projector to the optical film will be referred to as "white light", and light having the minimum brightness projected from the projector to the optical film will be referred to as "black light".

In a case where external light is not present, the contrast is represented by a ratio Yw/Yb of a white brightness Yw to a black brightness Yb in light projected to and reflected from the optical film.

In a black display, the brightness value is ideally 0. However, since leakage light is present, the brightness value may not be 0.

Figure 4:
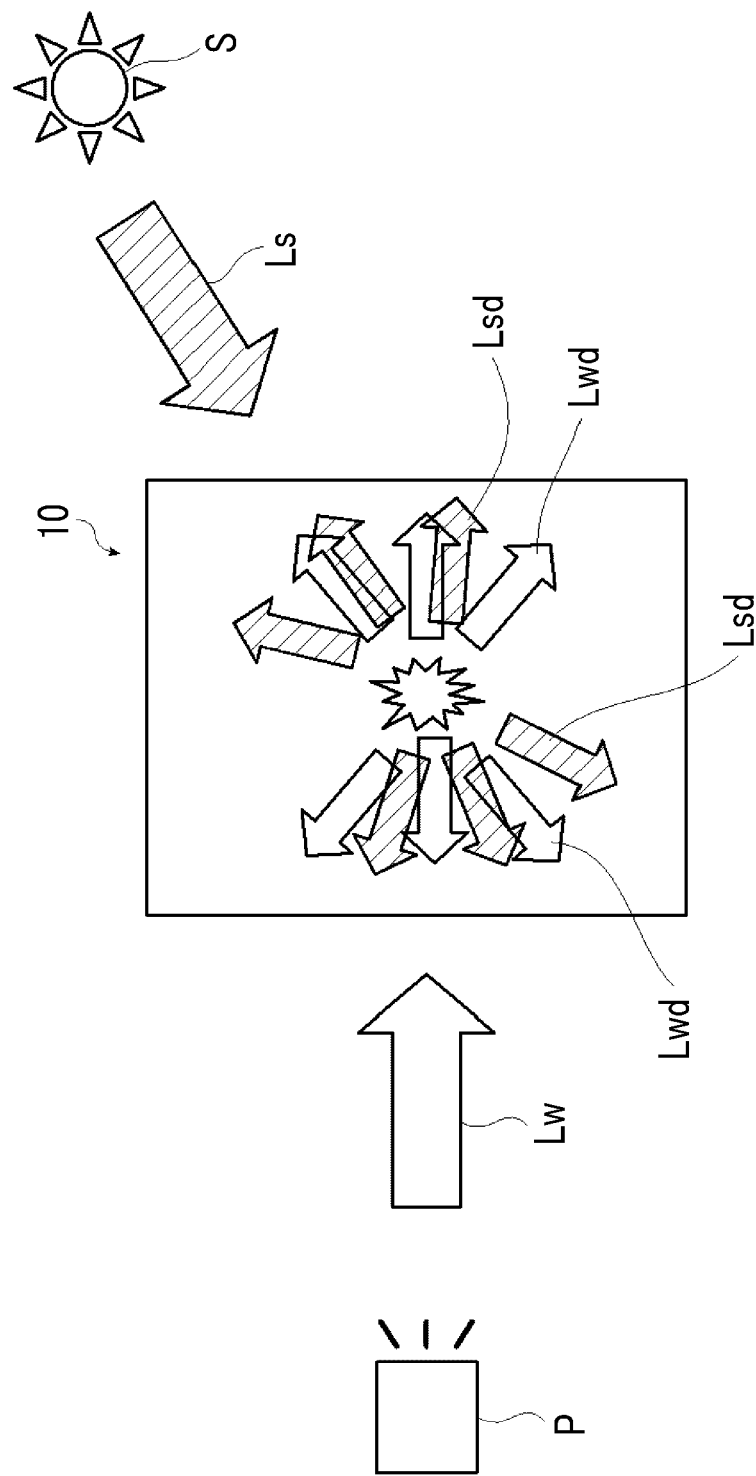
FIG. 4 is a schematic cross-sectional view showing the influence of external light on the contrast.
Figure 5:
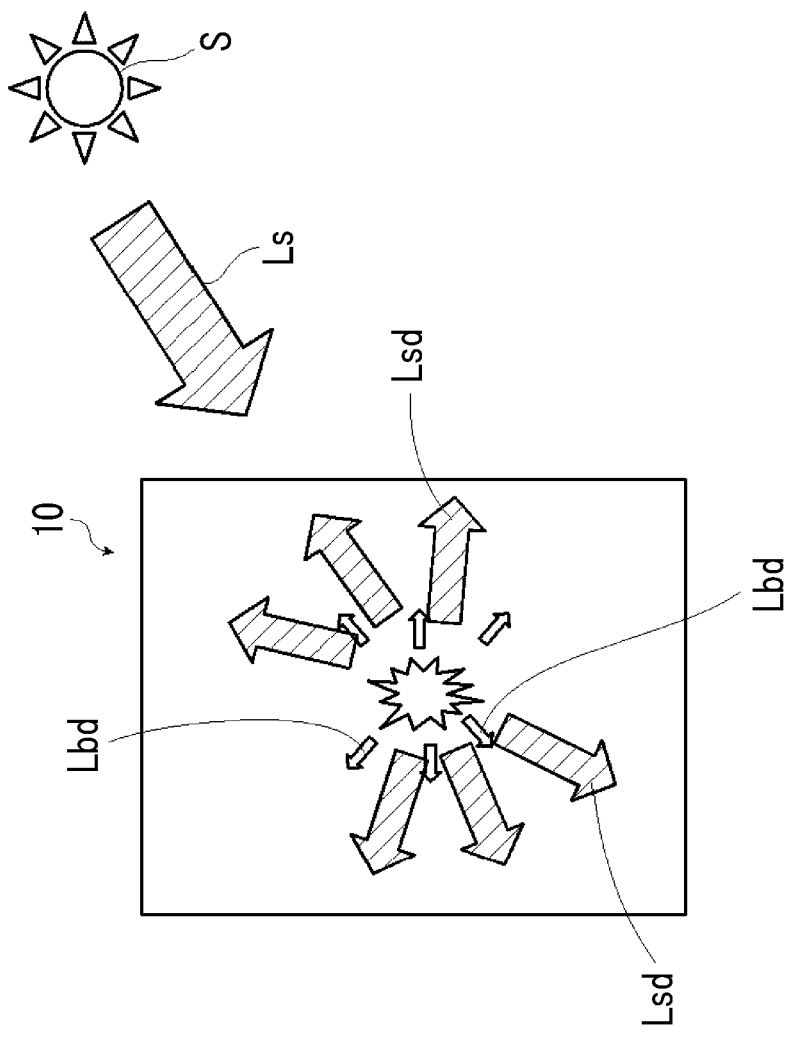
FIG. 5 is a schematic cross-sectional view showing the influence of external light on the contrast.

FIG. 4 is a diagram in a case where white light is projected, and FIG. 5 is a diagram in a case where black light is projected.

As shown in FIG. 4, in a case where white light Lw is projected from a projector P to an optical film 10, in the white light Lw, a part of white light Lwd scattered in the optical film 10 is emitted to a front surface of the optical film. In addition, external light Ls emitted from an external light source S is incident on the optical film 10 and is scattered therein, and a part of the scattered external light Lsd is emitted to the front surface of the optical film.

Therefore, in a case where the white light is projected in the bright room environment where the external light is present, the brightness of light emitted from the optical film is the sum of the brightness Yw of the scattered white light Lwd and the brightness Ys of the scattered external light Lsd.

On the other hand, as shown in FIG. 5, in a case where black light Lb is projected from the projector P to the optical film 10, in the black light Lb, a part of black light Lbd scattered in the optical film 10 is emitted to the front surface of the optical film. In addition, external light Ls emitted from the external light source S is incident on the optical film 10 and is scattered therein, and a part of the scattered external light Lsd is emitted to the front surface of the optical film.

Therefore, in a case where the black light is projected in the bright room environment where the external light is present, the brightness of light emitted from the optical film is the sum of the brightness Yb of the scattered black light Lbd and the brightness Ys of the scattered external light Lsd.

Accordingly, in a case where the external light is present, the contrast is represented by (Yw+Ys)/(Yb+Ys) and is lower than the contrast Yw/Yb in a case where the external light is not present.

The black brightness Yb is a value close to 0 (or equal to 0). Therefore, in order to increase the contrast in the presence of external light, a method of increasing the white brightness Yw or reducing the brightness Ys of the external light can be considered.

Figure 6:
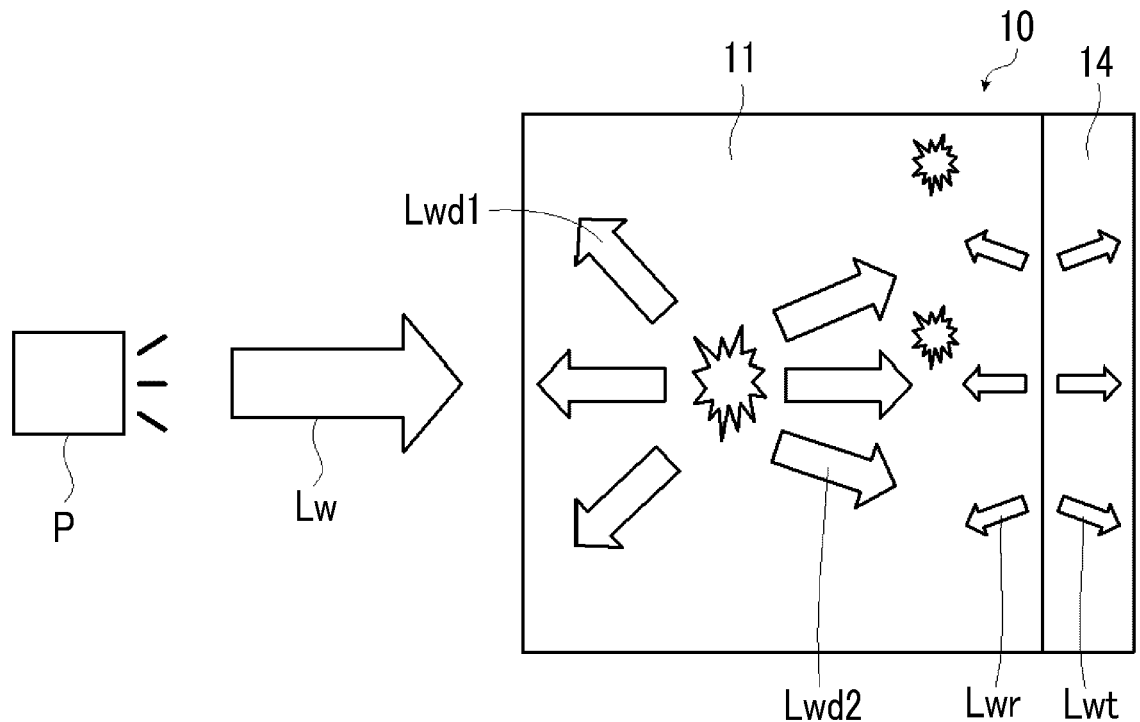
FIG. 6 is a schematic cross-sectional view showing the action of the optical film according to the present invention.

Here, as described above, the optical film according to the embodiment of the present invention includes the transparent reflecting layer on the back surface of the transparent screen. Therefore, as shown in FIG. 6, a part of light Lwd2, which is scattered in the transparent screen 11 and propagates to the back surface side, is reflected from the transparent reflecting layer 14, and the reflected light Lwr is emitted from the front surface of the transparent screen 11. Accordingly, the white brightness Yw can be increased by the brightness of the reflected light Lwr.

Further, in a case where light is vertically incident on the main surface of the transparent screen of the optical film according to the embodiment of the present invention, the ratio $T_{15}/T_{30}$ of the light amount $T_{15}$ of transmitted light at an angle of 15 degrees with respect to the normal direction of the main surface to the light amount $T_{30}$ of transmitted light at an angle of 30 degrees with respect to the normal direction of the main surface is 2.0 or higher, and the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface is 2.0 or lower.

The reflected light of the transparent screen is the light Lwd1 that is projected from the projector, is scattered in the transparent screen, and is emitted from the front surface of the transparent screen.

By adjusting a ratio $R_{15}/R_{30}$ of a light amount $R_{15}$ of the light Lwd1 at an angle of 15 degrees with respect to the normal direction of the main surface to a light amount $R_{30}$ of the light Lwd1 at an angle of 30 degrees with respect to the normal direction of the main surface to be 2.0 or lower, the light amount of the light emitted in an oblique direction of the transparent screen increases, a video can be favorably displayed even in a case where the transparent screen is seen from the oblique direction, and the viewing angle can be widened.

On the other hand, the transmitted light of the transparent screen is the light Lwd2 that is projected from the projector, is scattered in the transparent screen, and is emitted from the rear surface of the transparent screen.

By adjusting a ratio $T_{15}/T_{30}$ of a light amount $T_{15}$ of the light Lwd2 at an angle of 15 degrees with respect to the normal direction of the main surface to a light amount $T_{30}$ of the light Lwd2 at an angle of 30 degrees with respect to the normal direction of the main surface to be 2.0 or higher, the light Lwr obtained by the light Lwd2 being reflected from the transparent reflecting layer 14 can be directed to the front surface side of the transparent screen, and the effect of improving the brightness by the reflected light Lwr can be further improved.

Accordingly, by increasing the white brightness Yw, the contrast (Yw+Ys)/(Yb+Ys) in a case where external light is present can be improved.

The effect of improving the brightness by the reflected light also functions for the black brightness Yb. However, since the value of the black brightness is small, the influence on the contrast is small.

In addition, in the transparent screen, the ratio $T_{15}/T_{30}$ of the light amount $T_{15}$ of transmitted light at an angle of 15 degrees with respect to a normal direction of the main surface to the light amount $T_{30}$ of transmitted light at an angle of 30 degrees with respect to the normal direction of the main surface is preferably 2.0 to 50.0 and more preferably 3.0 to 30.0 from the viewpoint that the viewing angle can be widened and the viewpoint that the contrast can be improved.

In addition, in the transparent screen, the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface is preferably 1.0 to 5.0 and more preferably 1.0 to 3.0 from the viewpoint that the viewing angle can be widened and the viewpoint that the contrast can be improved.

In the transparent screen, the light amount $T_{15}$ of transmitted light at an angle of 15 degrees, the light amount $T_{30}$ of transmitted light at an angle of 30 degrees, the light amount $R_{15}$ of reflected light at an angle of 15 degrees, and the light amount $R_{30}$ of reflected light at an angle of 30 degrees can be measured using a goniophotometer (GP-200, manufactured by Murakami Color Research Laboratory Co., Ltd.). In the present invention, as the light amount, the brightness value (Y value) measured using the goniophotometer is used.

Here, in the case of the transparent screen including a plurality of cholesteric liquid crystal dots, by adjusting the shape, size, arrangement density, and the like of the dots, in the transparent screen, the ratio $T_{15}/T_{30}$ of the light amount $T_{15}$ of transmitted light at an angle of 15 degrees with respect to the normal direction of the main surface to the light amount $T_{30}$ of transmitted light at an angle of 30 degrees with respect to the normal direction of the main surface and the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface can be adjusted.

For example, by reducing the dot height or reducing the arrangement density, the light amount ratio $T_{15}/T_{30}$ of transmitted light can be increased.

Next, the material, shape, and the like of each of the components of the optical film according to the embodiment of the present invention will be described in detail.

[Substrate]

The substrate included in the transparent screen functions as a substrate for forming the dot on the surface.

It is preferable that the reflectivity of the substrate is low at a wavelength where the dot reflects light, and it is preferable that the substrate does not include a material which reflects light at a wavelength where the dot reflects light.

In addition, it is preferable that the substrate is transparent in the visible range. In addition, the substrate may be colored. However, it is preferable that the substrate is not colored or the area of the substrate colored is small. Further, the refractive index of the substrate is preferably about 1.2 to 2.0 and more preferably about 1.4 to 1.8.

In addition, a haze value of the substrate is preferably 30% or lower, more preferably 0.1% to 25%, and still more preferably 0.1% to 10%. Further, by using the substrate having a high haze such as an antiglare (AG) substrate, the haze value can be adjusted such that transparency deteriorates and front brightness or viewing angle characteristics are improved.

The thickness of the substrate may be selected depending on the application without any particular limitation, and is preferably about 5 μm to 1000 μm, more preferably 10 μm to 250 μm, and still more preferably 15 μm to 150 μm.

The substrate may have a single-layer structure or multi-layer structure. In a case where the substrate has a single-layer structure, examples thereof include a substrate formed of glass, triacetyl cellulose (TAC), polyethylene terephthalate (PET), polycarbonates, polyvinyl chloride, acryl, polyolefin, or the like. In a case where the substrate has a multi-layer structure, examples thereof a substrate including: one of the examples of the substrate having a single-layer structure that is provided as a support; and another layer that is provided on a surface of the support.

In addition, an underlayer may be provided on the surface of the substrate (between the substrate and the dots). Examples of the underlayer include a layer for adjusting the surface shape during the formation of a dot (specifically, for adjusting the surface energy of the underlayer surface), a layer for improving adhesion properties with a dot, and an aligned layer for adjusting the orientation of a polymerizable liquid crystal compound during the formation of a dot.

It is preferable that the reflectivity of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. It is preferable that the underlayer is a thermosetting resin or a photocurable resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

[Dot]

The transparent screen includes dots that are formed on a surface of the substrate. The dots may be formed on a single surface or both surfaces of the substrate. In a case where the dots are formed on both surfaces of the substrate, light having passed through portions on the light incident surface side where the dots are not formed is reflected from the dots on the back surface side such that the reflection intensity can be improved. That is, in a case where the dots are formed on both surfaces of the substrate, it is preferable that the dots on the back surface side are formed at positions where the dots on the front surface side are not formed.

Two or more dots may be formed on the surface of the substrate. Two or more dots are formed to be adjacent to each other on the surface of the substrate. At this time, as described above, two or more dots may be arranged regularly in a predetermined pattern or may be arranged randomly. In addition, the dots may be arranged uniformly on the entire surface of the substrate or may be arranged only in at least a partial region of the substrate.

Here, the arrangement density of the dots is not particularly limited and may be appropriately set depending on diffusibility (viewing angle), transparency, and the like required for the transparent screen.

For example, from the viewpoint that a wide viewing angle and high transparency can be simultaneously realized and the viewpoint of obtaining an appropriate density or the like at which the dots can be manufactured without defects such as coalescence or deletion of the dots during manufacturing, in case of being seen from a normal direction of a main surface of the substrate, an area ratio of the dots with respect to the substrate is preferably 1.0% to 90.6%, more preferably 2.0% to 50.0%, and still more preferably 4.0% to 30.0%.

The area ratio of the dots is obtained by obtaining an image using a microscope such as a laser microscope, a scanning electron microscope (SEM) or a transmission electron microscope (TEM), measuring area ratios in a region having a size of 1 mm×1 mm, and obtaining an average value of area ratios at five positions.

Likewise, from the viewpoint that a wide viewing angle and high transparency can be simultaneously realized, a pitch between adjacent dots is preferably 20 μm to 500 μm, more preferably 20 μm to 300 μm, and still more preferably 20 μm to 150 μm.

In a case where a plurality of dots are provided on a surface of the substrate, the diameters and shapes of the dots may be the same as or different from each other and are preferably the same as each other. For example, it is preferable that the dots are formed under the same conditions for forming the dots having the same diameter and shape.

In this specification, the description of the dot is applicable to all the dots in the optical film according to the embodiment of the present invention. Further, it is allowable that the optical film according to the embodiment of the present invention including the above-described dots also includes a dot which deviates from the above description due to an error which is allowable in the technical field.

(Shape of Dot)

The dots may be circular in case of being observed from the normal direction of the main surface of the substrate (hereinafter, also referred to "substrate normal direction"). The circular shape is not necessarily a perfect circle and may be a substantially circular shape. The center of the dot described herein refers to the center of the circle or the center of gravity. In a case where a plurality of dots are provided on a surface of the substrate, it is preferable that the average shape of the dots is circular, and some dots may have a shape other than a circular shape.

In case of being seen from the substrate normal direction, a diameter of the dots is preferably 10 to 200 μm and more preferably 20 to 120 μm.

The diameter of the dot can be obtained by measuring the length of a line, which ranges from an end portion (an edge or a boundary of the dot) to another end portion and passes through the center of the dot, in an image obtained using a microscope such as a laser microscope, a scanning electron microscope (SEM), or a transmission electron microscope (TEM). The number of dots and the inter-dot distance can be obtained from a microscopic image obtained using a laser microscope, a scanning electron microscope (SEM), or a transmission electron microscope (TEM)

In a case where a dot has a shape other than a circular shape in case of being seen from the substrate normal direction, the diameter (equivalent circle diameter) of a circle having an area equal to the projected area of the dot is obtained as the diameter of the dot.

The dot includes a portion having a height which continuously increases to a maximum height in a direction moving from an end portion of the dot to the center of the dot. That is, the dot includes an inclined portion, a curved portion, or the like whose height increases from an end portion of the dot to the center of the dot. In this specification, the above portion will also be referred to as the inclined portion or the curved portion. The inclined portion or the curved portion refers to a portion of a dot surface in a cross-sectional view perpendicular to the main surface of the substrate, the portion being surrounded by a portion of the dot surface which ranges from a continuous increasing start point to a maximum height point, a straight line which connects the points to the substrate at the shortest distance, and the substrate.

"The height" of the dot described in this specification refers to "the shortest distance from a point of a surface of the dot opposite to the substrate to a surface of the substrate where the dot is formed". At this time, the surface of the dot may be an interface with another layer. In addition, in a case where the substrate has unevenness, a surface of an end portion of the dot extending from the substrate surface is set as the surface where the dot is formed. The maximum height refers to a maximum value of the height which is, for example, the shortest distance from the peak of the dot to the surface of the substrate where the dot is formed. The height of the dot can be obtained from a cross-sectional view of the dot which is obtained by focal position scanning using a laser microscope or obtained using a microscope such as a SEM or a TEM.

The inclined portion or the curved portion may be present at end portions in some or all the directions when seen from the center of the dot. For example, in a case where the dot is circular, end portions correspond to the circumference, and the inclined portion or the curved portion may be present at end portions in some directions of the circumference (for example, portions corresponding to a length of 30% or more, 50% or more, or 70% or more and 90% or less of the circumference), or may be present at end portions in all the directions of the circumference (90% or more, 95% or more, or 99% or more of the circumference). It is preferable that the end portions of the dot may be present in all the directions of the circumference. That is, it is preferable that changes in height from the center of the dot to the circumference are the same in all the directions of the circumference. In addition, it is preferable that optical characteristics such as retroreflection properties and properties described regarding the cross-sectional view are the same in all the directions moving from the center to the circumference.

The inclined portion or the curved portion may be at a predetermined distance from an end portion of the dot (an edge or a boundary of the circumference) so as not to reach the center of the dot, or may reach the center of the dot from an end portion of the dot. In addition, the inclined portion or the curved portion may be at a predetermined distance from a portion, which is at a predetermined distance from an edge (boundary) of the circumference of the dot, so as not to reach the center of the dot, or may reach the center of the dot from a portion which is at a predetermined distance from an end portion of the circumference of the dot.

Examples of a shape of a structure including the inclined portion or the curved portion includes a hemispherical shape in which the substrate side is planar, a shape (spherical segment shape) in which the top of the hemispherical shape is cut and smoothened to be substantially parallel to the substrate, a conical shape having a bottom on the substrate side, and a shape (truncated conical shape) in which the top of the conical shape is cut and smoothened to be substantially parallel to the substrate. Among these shapes, a hemispherical shape in which the substrate side is planar, a shape in which the top of the hemispherical shape is cut and smoothened to be substantially parallel to the substrate, or a shape in which the top of a conical shape having a bottom on the substrate side is cut and smoothened to be substantially parallel to the substrate is preferable. The hemispherical shape represents not only a hemispherical shape in which a surface including the center of a sphere is planar but also any one of spherical segment shapes obtained by cutting a sphere into two segments at an arbitrary position (preferably a spherical segment shape not including the center of the sphere).

A point of the dot surface for obtaining the maximum height of the dot may be present at the peak of a hemispherical shape or a conical shape or may be present on a surface which is cut and smoothened to be substantially parallel to the substrate. It is preferable that the maximum height of the dot is obtained at all the points of the smooth surface. It is also preferable that the maximum height is obtained at the center of the dot.

In addition, an angle (for example, an average value) between a surface of the dot opposite to the substrate and the substrate (surface of the substrate where the dot is formed), that is, a contact angle between the substrate and the dot is preferably 40° or more and more preferably 60° or more. By adjusting the contact angle to be in the above-described range, a wide viewing angle and high transparency can be simultaneously realized.

The angle can be obtained from a cross-sectional view of the dot which is obtained by focal position scanning using a laser microscope or obtained using a microscope such as a SEM or a TEM. In this specification, in a SEM image of a cross-sectional view of a surface of the dot perpendicular to the substrate including to the center of the dot, the angle of a contact portion between the substrate and the dot surface is measured.

As described above, by providing the underlayer between the substrate and the dots, the contact angle between the substrate and the dots can be adjusted to be in the desired range.

(Optical Characteristics of Dot)

The dot has wavelength selective reflecting properties. Light where the dot exhibits selective reflecting properties is not particularly limited. For example, any one of infrared light, visible light, and ultraviolet light may be used. For example, in a case where the transparent screen is used as a screen that can display an image of video light emitted from a video device such as a projector and a background on the back surface side of the transparent screen in an overlapping manner, it is preferable that light where the dots exhibit selective reflecting properties is visible light.

Alternatively, it is also preferable that the reflection wavelength is selected depending on the wavelength of light irradiated from a light source into which the optical film according to the embodiment of the present invention is incorporated.

The dot is formed of a liquid crystal material having a cholesteric structure. The wavelength of light where the dot exhibits selective reflecting properties can be adjusted by adjusting a helical pitch in the cholesteric structure of the liquid crystal material which forms the dot as described above. In addition, regarding the liquid crystal material for forming the dot in the transparent screen according to the present invention, a helical axis direction of the cholesteric structure is controlled as described below. Therefore, incidence light is reflected not only specularly but also in various directions.

The dot may be colored. However, it is preferable that the dot is not colored or the area of the dot colored is small. As a result, the transparency of the transparent screen can be improved.

(Cholesteric Structure)

It is known that the cholesteric structure exhibits selective reflecting properties at a specific wavelength. A center wavelength of the selective reflection depends on a pitch P (=helical cycle) of a helical structure in the cholesteric structure and complies with an average refractive index n of a cholesteric liquid crystal and a relationship of $\lambda = n \times P$. Therefore, the selective reflection wavelength can be adjusted by adjusting the pitch of the helical structure. The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent. The details of the adjustment of the pitch can be found in "Fuji Film Research & Development" No. 50 (2005), pp. 60 to 63. As a method of measuring a helical sense or pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric structure has a stripe pattern including bright portions and dark portions in a cross-sectional view of the dot when observed with a scanning electron microscope (SEM). Two cycles of the bright portion and the dark portion (two bright portions and two dark portions) correspond to one helical pitch. Based on the above fact, the pitch can be measured from the SEM cross-sectional view. A normal line of each line of the stripe pattern is a helical axis direction.

Reflected light of the cholesteric structure is circularly polarized light. That is, reflected light of the dot in the optical film according to the embodiment of the present invention is circularly polarized light. The application of the optical film according to the embodiment of the present invention can be selected in consideration of the circularly polarized light selective reflecting properties. Whether or not the reflected light is right circularly polarized light or left circularly polarized light is determined depending on a helical twisting direction of the cholesteric structure. Regarding the selective reflection by the cholesteric liquid crystals, in a case where the helical twisting direction of the cholesteric liquid crystals is right, right circularly polarized light is reflected, and in a case where the helical twisting direction of the cholesteric liquid crystals is left, left circularly polarized light is reflected.

In the present invention, as the dot, a right-twisted or left-twisted cholesteric liquid crystal may be used. Alternatively, it is also preferable that a direction of the circularly polarized light is selected to be the same as the direction of circularly polarized light of light irradiated from a light source into which the optical film according to the embodiment of the present invention is incorporated.

A direction of rotation of the cholesteric liquid crystalline phase can be adjusted by adjusting the kind of the liquid crystal compound and the kind of the chiral agent to be added.

In addition, a full width at half maximum $\Delta\lambda$ (nm) of a selective reflection bandwidth (circularly polarized light reflection bandwidth) in which selective reflection is exhibited depends on a birefringence $\Delta n$ of the liquid crystal compound and the pitch P and complies with a relationship of $\Delta\lambda = \Delta n \times P$. Therefore, the selective reflection bandwidth can be controlled by adjusting $\Delta n$. $\Delta n$ can be adjusted by adjusting the kind of the polymerizable liquid crystal compound and a mixing ratio thereof, or by controlling a temperature during oriented immobilization. The full width at half maximum of the reflection wavelength range is adjusted depending on the application of the optical film according to the embodiment of the present invention and is, for example, 50 to 500 nm and preferably 100 to 300 nm.

(Cholesteric Structure in Dot)

The dot obtained by immobilizing a cholesteric liquid crystalline phase has a stripe pattern including bright portions and dark portions in a cross-sectional thereof. In a case where the cross-sectional view of the dot obtained by immobilizing a cholesteric liquid crystalline phase is observed with a scanning electron microscope, an angle between a normal line of a line, which is formed using a first dark portion from a surface of the dot opposite to the substrate, and the surface of the dot opposite to the substrate is preferably in a range of 70° to 90°.

In the following description, "the surface of the dot opposite to the substrate" will also simply referred to as "the surface of the dot".

Figure 7:
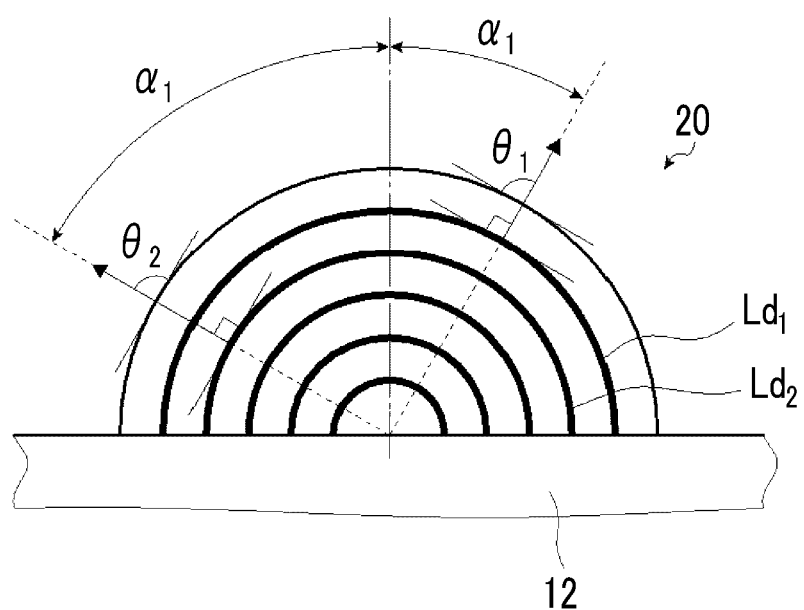
FIG. 7 is a schematic cross-sectional view showing a liquid crystal dot used in the optical film according to the present invention.

FIG. 7 is a schematic diagram showing a cross-section of the dot 20. In FIG. 7, lines which are formed using the dark portions are indicated by thick lines. As shown in FIG. 7, an angle $\theta_1$ between a normal line (broken line) of a line $Ld_1$, which is formed using the first dark portion, and the surface of the dot is preferably 70° to 90°.

Here, in a case where a position of the surface of the dot 20 is represented by an angle at with respect to a line (chain line) perpendicular to the surface of the substrate 12 which passes through the center of the dot, it is preferable that, at a position where the angle $\alpha_1$ is 30° and a position where the angle $\alpha_1$ is 60°, the angle between the normal line of the line $Ld_1$, which is formed using the first dark portion from the surface of the dot, and the surface of the dot is preferably in a range of 70° to 90°, and it is more preferable that, at all the positions of the surface of the dot, the angle between the normal line of the line $Ld_1$, which is formed using the first dark portion from the surface of the dot, and the surface of the dot is preferably in a range of 70° to 90°.

That is, it is preferable that the angle satisfies the above-described range at some positions of the surface of the dot. For example, it is preferable that the angle satisfies the above-described range not intermittently but continuously at some positions of the surface of the dot. In a case where the surface of the dot is curved in a cross-sectional view, the angle between the normal line of the line, which forms the dark portion, and the surface of the dot refers to an angle between a tangent line of the surface of the dot and the normal line. In addition, the angle between the normal line and the surface of the dot is expressed by an acute angle and is in a range of 70° to 110° in case of being expressed by an angle of 0° to 180°.

In a cross-sectional view of the dot, it is preferable that an angle $\theta_2$ between a normal line of a line $Ld_2$, which is formed using a second dark portion from the surface of the dot, and the surface of the dot is preferably in a range of 70° to 90°, it is more preferable that an angle $\theta$ between a normal line of each of lines, which are formed using third and fourth dark portions from the surface of the dot, and the surface of the dot is preferably in a range of 70° to 90°, and it is still more preferable that an angle $\theta$ between a normal line of each of lines, which are formed using fifth to twelfth dark portions from the surface of the dot, and the surface of the dot is preferably in a range of 70° to 90°.

Further, the angle between the normal line of the line, which is formed using the dark portion, and the surface of the dot is more preferably 80° to 90° and still more preferably 85° to 90°.

In a case where the dot is observed with a SEM, the cross-sectional view obtained using the SEM shows that a helical axis of the cholesteric structure forms an angle of 70° to 90° with a surface of the dot of the inclined portion or the curved portion. Due to the above-described structure, light incident on the dot in a direction with an angle from a normal direction of the substrate can be made to be incident at an angle, which is substantially parallel to the helical axis direction of the cholesteric structure, at the inclined portion or the curved portion. Therefore, light which is incident on the dot can be reflected in various directions.

Figure 8:
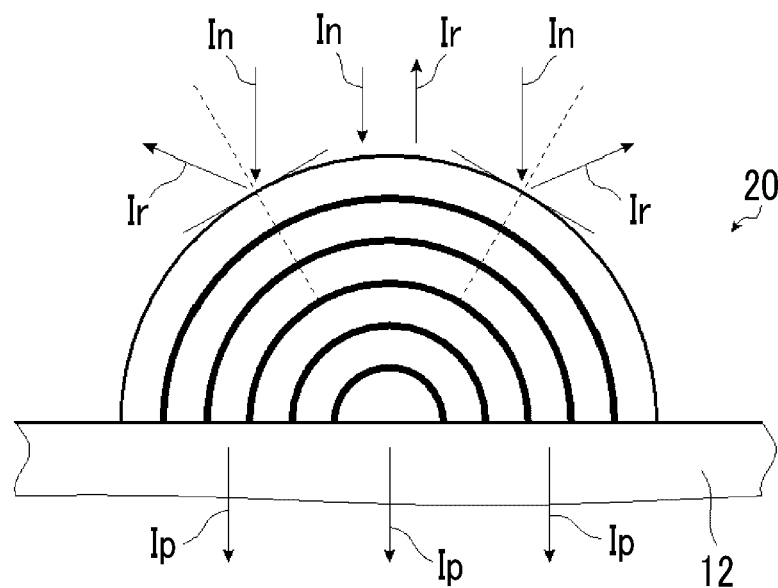
FIG. 8 is a schematic cross-sectional view showing the action of the liquid crystal dot.

In addition, the dot specularly reflects incidence light with respect to the helical axis of the cholesteric liquid crystalline phase. Therefore, as conceptually shown in FIG. 8, light In is incident from the normal direction of the substrate 12, whereas reflected light Ir reflected from the vicinity of the center of the dot 20 is reflected parallel to the normal direction of the substrate 12. On the other hand, at a position which deviates from the center of the dot 20 (a position where the helical axis of the cholesteric liquid crystalline phase is inclined with respect to the normal direction of the substrate 12), the reflected light Ir is reflected in a direction different from the normal direction of the substrate 12. Accordingly, light which is incident on the dot can be reflected in various directions, and the viewing angle can be widened. In addition, light Ip which is transmitted through the dot is transmitted in the same direction as that of the incidence light In. Therefore, the scattering of the transmitted light can be suppressed to reduce the haze, and the transparency can be improved.

In addition, it is preferable that light incident from the normal direction of the substrate can be reflected in all the directions. In particular, it is preferable that an angle (half power angle) in which the brightness is half of the front brightness (peak brightness) can be made to be 35° or more and that high reflecting properties are exhibited.

It is preferable that, by making a helical axis of the cholesteric structure to form an angle of 70° to 90° with a surface of the dot of the inclined portion or the curved portion, an angle between a normal direction of a line, which is formed using a first dark portion from the surface, and a normal direction of the substrate continuously decreases along with a continuous increase in the height.

The cross-sectional view is a cross-sectional view of a surface in an arbitrary direction including a portion having a height which continuously increases to a maximum height in a direction moving from an end portion of the dot to the center of the dot. Typically, the cross-sectional view may be a cross-sectional view of an arbitrary surface which includes the center of the dot and is perpendicular to the substrate.

(Method of Forming Cholesteric Structure)

The cholesteric structure can be obtained by immobilizing a cholesteric liquid crystalline phase. The structure in which a cholesteric liquid crystalline phase is immobilized may be a structure in which the orientation of the liquid crystal compound as a cholesteric liquid crystalline phase is immobilized. Typically, the structure in which a cholesteric liquid crystalline phase is immobilized may be a structure which is obtained by making the polymerizable liquid crystal compound to be in a state where a cholesteric liquid crystalline phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force. The structure in which a cholesteric liquid crystalline phase is immobilized is not particularly limited as long as the optical characteristics of the cholesteric liquid crystalline phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the cholesteric structure include a liquid crystal composition including a liquid crystal compound. It is preferable that the liquid crystal compound is a polymerizable liquid crystal compound.

The liquid crystal composition including a polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming a cholesteric liquid crystal layer include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

Specific examples of the polymerizable liquid crystal compound include compounds represented by the following Formulae (1) to (11).

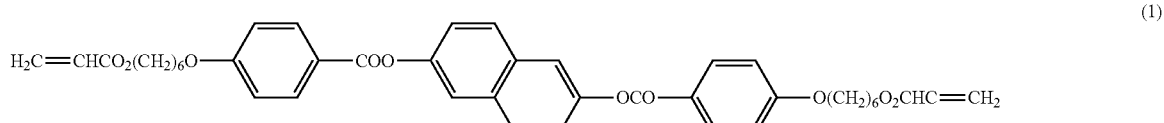

(1)

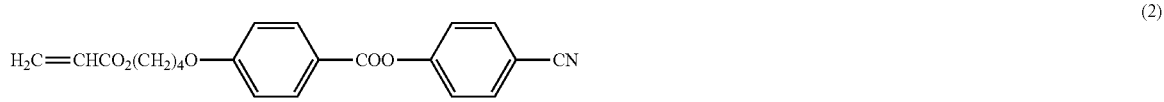

(2)

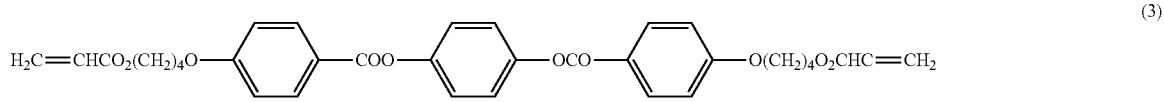

(3)

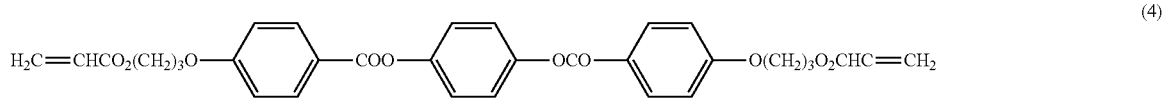

(4)

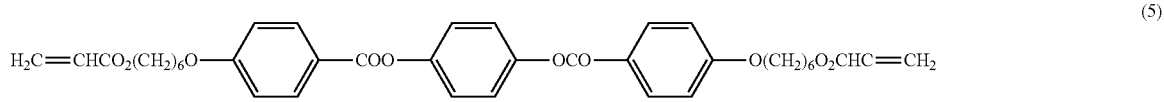

(5)

-continued

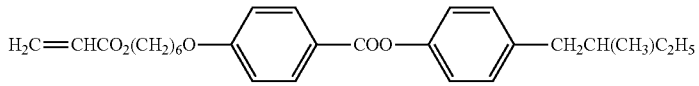
(6)

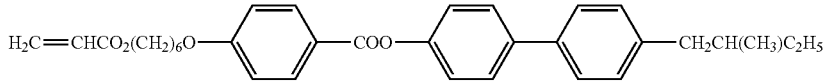
(7)

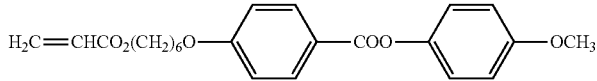
(8)

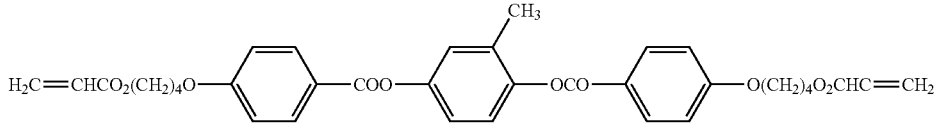
(9)

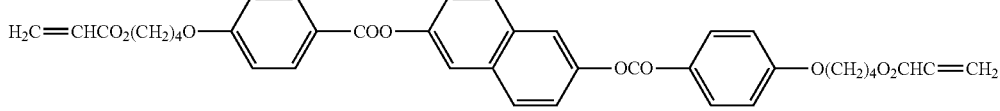
(10)

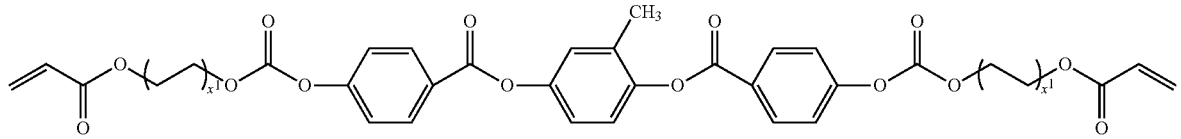
(11)

[In Compound (11), $X^1$ Represents 2 to 5 (Integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The present inventors found that, by adding the surfactant to the liquid crystal composition during the formation of a dot, the polymerizable liquid crystal compound is oriented to be parallel to an air interface side during the formation of the dot, and the helical axis direction of the dot is controlled as described above. In general, for the formation of a dot, it is necessary that the surface tension is not decreased to maintain a liquid droplet shape during printing. Therefore, it is surprising that a dot can be formed even after the addition of the surfactant and that the dot exhibits high retroreflection properties in multiple directions. By using the surfactant, a dot in which an angle between a dot surface and the substrate at a dot end portion is 40° or more can be formed. That is, by adding the surfactant during the formation of the dot, the contact angle between the dot and the substrate can be formed in an angle range where a wide viewing angle and high transparency can be simultaneously realized.

It is preferable that the surfactant is a compound which can function as an alignment controller contributing to the stable or rapid formation of a cholesteric structure with planar orientation. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal alignment agent, one kind may be used alone, or two or more kinds may be used in combination.

As the fluorine surfactant, a compound represented by the following Formula (I) described in paragraphs "0082" to "0090" of JP2014-119605A is preferable.

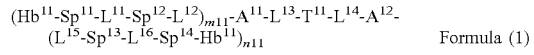
Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp_{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be oriented even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent aromatic heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

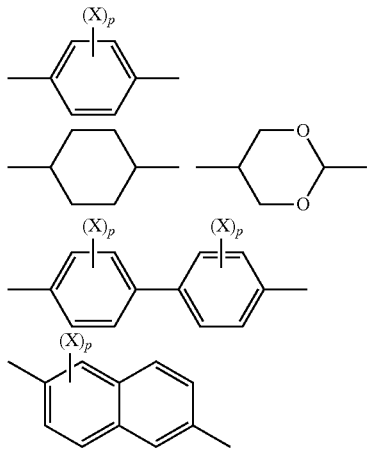

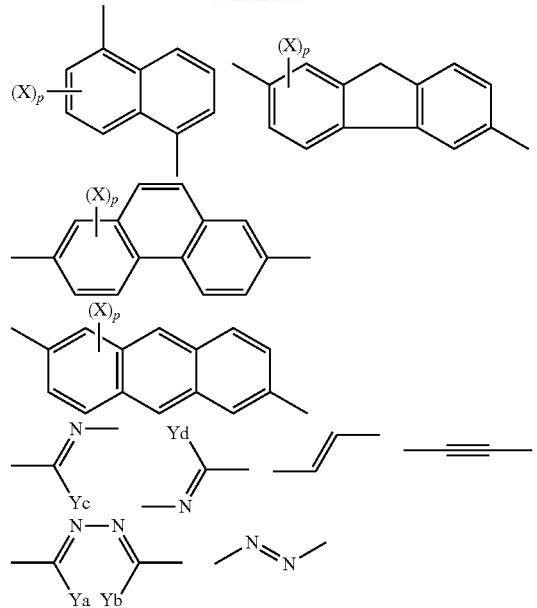

more preferably represented by any one of the following formulae,

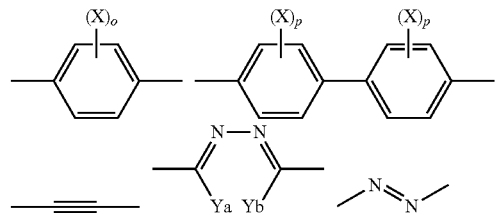

still more preferably represented by the following formula.

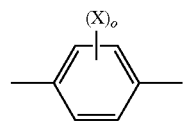

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R'COO—. R' represents, for example, an alkyl group having 1 to 8 carbon atoms. The description and preferable range of the alkyl group represented by R' can be found in the description and preferable range of the alkyl group represented by X in $T^{11}$. Specific examples of the ester include $CH_3COO-$ and $C_2H_5COO-$. The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5-membered or 6-membered ring is more preferable, and a 6-membered ring is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^{11}$ or $A^{12}$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and $m11+n11 \geq 1$. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, and rotational symmetry.

The compound represented by Formula (I) is a combination of the perfluoroalkyl group ($Hb^{11}$), the linking groups $-(-Sp^{11}-L^{11}-Sp^{12}-L^{12})m_{11}-A^{11}-L^{13}$ and $-L^{14}-A^{12}-(L^{15}-Sp^{13}-L^{16}-Sp^{14})n_{11}-$ and preferably the divalent group having an excluded volume effect which is represented by T. Two perfluoroalkyl groups ($Hb^{11}$) present in the molecule are preferably the same as each other, and the linking groups $-(-Sp^{11}-L^{11}-Sp^{12}-L^{12})m_{11}-A^{11}-L^{13}$ and $-L^{14}-A^{12}-(L^{15}-Sp^{13}-L^{16}-Sp^{14})n_{11}-$ present in the molecule are also preferably the same as each other. $Hb^{11}-Sp^{11}-L^{11}-Sp^{12}-$ and $-Sp^{13}-L^{16}-Sp^{14}-Hb^{11}$ present at the terminal are preferably a group represented by any one of the following formulae:

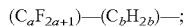

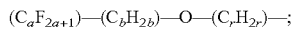

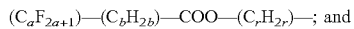

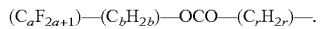

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}-Sp^{11}-L^{11}-Sp^{12}-L^{12}-$ and $-L^{15}-Sp^{13}-L^{16}-Sp^{14}-Hb^{11}$ present at the terminal of Formula (I) are preferably a group represented by any one of the following formulae:

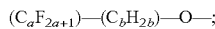

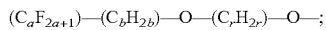

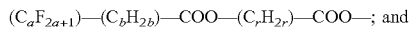

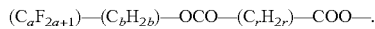

In the above formulae, a, b, and r have the same definitions as described above.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

—Chiral Agent (Optically Active Compound)—

The chiral agent has a function of causing a helical structure of a cholesteric liquid crystalline phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and alignment, which is preferable. As the photoisomerization group, an isomerization portion of a photochromic compound, azo, azoxy, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

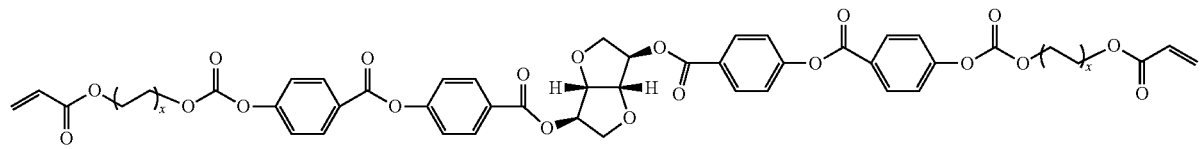

(12)

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 mass % to 12 mass % with respect to the content of the polymerizable liquid crystal compound.

—Crosslinking Agent—

In order to improve the film hardness after curing and to improve durability, the liquid crystal composition may include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. As the crosslinking agent, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric liquid crystal layer may deteriorate.

—Other Additives—

In a case where an ink jet method described below is used as a method of forming the dot, a monofunctional polymerizable monomer may be used in order to obtain generally required ink physical properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, an ultraviolet absorber, a light stabilizer, a coloring material, metal oxide particles or the like can be added to the liquid crystal composition in a range where optical performance and the like do not deteriorate.

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. As the organic solvent, one kind may be used alone, or two or more kinds may be used in combination. Among these, a ketone is more preferable in consideration of an environmental burden. The above-described component such as the above-described monofunctional polymerizable monomer may function as the solvent.

The liquid crystal composition is applied to the substrate and then is cured to form the dot. The application of the liquid crystal composition to the substrate is preferably performed by jetting. In a case where a plurality of dots are formed on the substrate, the liquid crystal composition may be printed as an ink. A printing method is not particularly limited and, for example, an ink jet method, a gravure printing method, or a flexographic printing method can be used. Among these, an ink jet method is preferable. The pattern of the dots can also be formed using a well-known printing technique.

In addition, one dot having a plurality of regions that reflect light components in different wavelength ranges or one dot having a region that reflects right circularly polarized light and a region that reflects left circularly polarized light can be formed as follows. First, a liquid crystal composition for forming a layer on the substrate side is applied using the above-described printing method and is cured to form a first layer. Next, a liquid crystal composition for forming a second layer is applied to the first layer and is cured to form a second layer. Further, third or subsequent layers are formed using the same method. As a result, a dot having a plurality of regions that are different from each other in the wavelength range of light to be reflected or in the polarization direction can be formed.

The liquid crystal composition applied to the substrate is optionally dried or heated and then cured. In a drying or heating step, the polymerizable liquid crystal compound in the liquid crystal composition only has to be oriented. In the case of heating, the heating temperature is preferably 200° C. or lower and more preferably 130° C. or lower.

The oriented liquid crystal compound may be further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 100 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an IR absorption spectrum.

[Overcoat Layer]

The transparent screen may include an overcoat layer. The overcoat layer is not particularly limited as long as it is provided on the surface of the substrate where the dots are formed, and it is preferable that the surface of the transparent screen is smoothened.

The overcoat layer is not particularly limited. However, as described above, it is preferable that a difference in refractive index between the overcoat layer and the dot is as low as possible, and the difference in refractive index is preferably 0.04 or lower. Since the refractive index of the dot formed of the liquid crystal material is about 1.6, it is preferable that the overcoat layer is a resin layer having a refractive index of about 1.4 to 1.8. By using the overcoat layer having a refractive index similar to the refractive index of the dot, the angle (polar angle) of light actually incident on the dot from the normal line can be reduced. For example, in a case where the overcoat layer having a refractive index of 1.6 is used and light is incident on the transparent screen at a polar angle of 45°, a polar angle at which light is actually incident on the dot can be made to be about 27°. Therefore, by using the overcoat layer, the polar angle of light at which the transparent screen exhibits retroreflection properties can be widened, and high retroreflection properties can be obtained at a wider range even in the dot in which an angle between a surface, which is opposite to the substrate, and the substrate is small. In addition, the overcoat layer may function as an antireflection layer, a pressure sensitive adhesive layer, an adhesive layer, or a hard coat layer.

Examples of the overcoat layer include a resin layer which is obtained by applying a composition including a monomer to the surface of the substrate where the dot is formed, and curing the coating film. The resin is not particularly limited and may be selected in consideration of, for example, adhesiveness with the substrate or the liquid crystal material for forming the dot. For example, a thermoplastic resin, a thermosetting resin, or an ultraviolet curable resin can be used. From the viewpoints of durability, solvent resistance, and the like, a resin which is curable by cross-linking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be selected depending on the maximum height of the dot without any particular limitation, and is preferably about 5 μm to 100 μm, more preferably 10 μm to 50 μm, and still more preferably 20 μm to 40 μm. The thickness is the distance from a surface of the substrate, where the dot is formed, to a surface of the overcoat layer provided on a surface of the substrate, where the dot is not formed, which is opposite to the surface where the dot is formed.

In the example shown in FIGS. 1 and 2, the transparent screen includes a plurality of cholesteric liquid crystal dots. However, the present invention is not limited to this example, and the transparent screen may include a resin layer in which a plurality of particles are dispersed in a resin binder.

Figure 9:
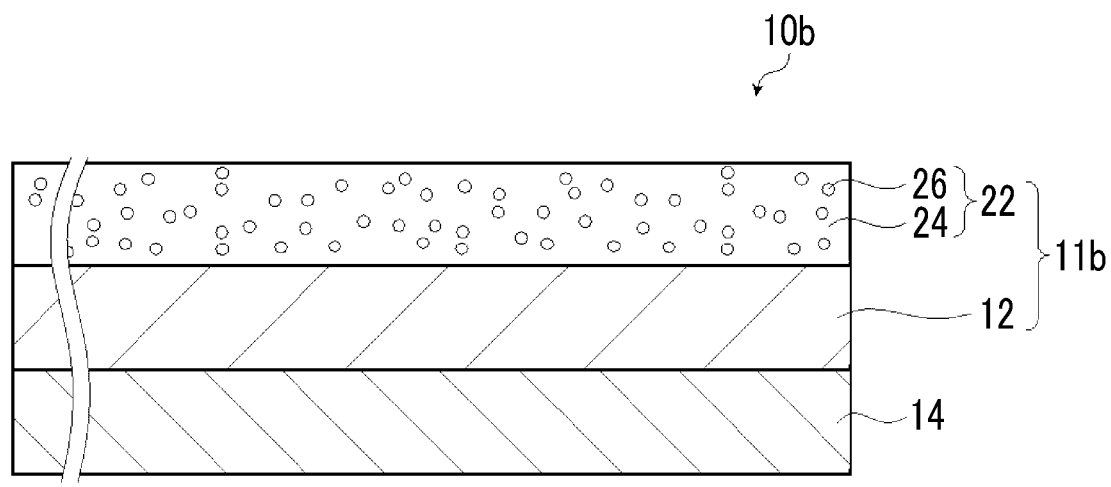
FIG. 9 is a cross-sectional view schematically showing another example of the optical film according to the present invention.

FIG. 9 is a cross-sectional view schematically showing another example of the optical film according to the embodiment of the present invention.

An optical film 10b shown in FIG. 9 includes: a transparent screen 11b; and the transparent reflecting layer 14 that is laminated on a back surface side of the transparent screen 11b.

The transparent screen 11b includes: the substrate 12; and a resin layer 22 that is laminated on the substrate 12. In the resin layer 22, a plurality of particles 26 are dispersed in a resin binder 24. The particle size of the particles 26 is 0.3 μm to 10 μm, and the content of the particles 26 in the resin layer 22 is 50 mass % or lower.

With the configuration in which the fine particles are dispersed in the resin binder, the transparent screen that reflects light incident from the front surface side of the screen and allows transmission of light incident from the back surface side can be obtained.

It is preferable that a resin having high transparency is used as the resin binder 24. Specifically, for example, polyethylene terephthalate, acryl, polyester, polycarbonate, triacetyl cellulose, a cycloolefin polymer, or a cyclic olefin copolymer can be used.

The thickness of the resin layer 22 is not particularly limited and is preferably 5 μm to 300 μm and more preferably 50 μm to 150 μm.

The particles 26 are organic or inorganic particles formed of, for example, acrylic particles, crosslinked acrylic particles, polystyrene particles, crosslinked styrene particles, melamine resin particles, benzoguanamine resin particles, silica particles, $TiO_2$ particles, or $ZrO_2$ particles. In addition, the resin layer 22 includes two or more kinds of particles 26 formed of different materials.

In addition, the particle size of the particles 26 is 0.3 μm to 10 μm, preferably 0.5 μm to 5 μm, and more preferably 1.0 μm to 3 μm.

By adjusting the particle size of the particles 26 to be in the above-described range, the effect of scattering projection light can be sufficiently obtained without deterioration in transmittance.

In the present invention, the particle size of the particles can be measured using SALD-7500 nano (manufactured by Shimadzu Corporation).

In addition, the content of the particles 26 is 50 mass % or lower, preferably 10 mass % to 40 mass %, and more preferably 15 mass % to 30 mass %.

By adjusting the content of the particles 26 to be in the above-described range, the effect of scattering projection light can be sufficiently obtained without deterioration in transmittance.

In addition, a ratio between the refractive index of the particles 26 and the refractive index of the resin binder 24 is preferably 0.91 to 1.5 and more preferably 0.95 to 1.47.

It is preferable that not only the refractive index ratio but also the particle size of the particles 26 are adjusted to be in the above-described ranges from the viewpoint that $T_{15}/T_{30}$ can be controlled in the preferable range.

Here, in the transparent screen including the resin layer in which a plurality of particles are dispersed in the resin binder, by adjusting the particle size of the particles, the content of the particles, the ratio between the refractive index of the particles and the refractive index of the resin binder, the shape of the particles, and the like, in the transparent screen, the ratio $T_{15}/T_{30}$ of the light amount $T_{15}$ of transmitted light at an angle of 15 degrees with respect to the normal direction of the main surface to the light amount $T_{30}$ of transmitted light at an angle of 30 degrees with respect to the normal direction of the main surface and the ratio $R_{15}/R_{30}$ of the light amount $R_{15}$ of reflected light at an angle of 15 degrees with respect to the normal direction of the main surface to the light amount $R_{30}$ of reflected light at an angle of 30 degrees with respect to the normal direction of the main surface can be adjusted.

For example, by increasing the particle size of the particles, the light amount ratio $T_{15}/T_{30}$ of transmitted light can be increased.

The optical film according to the embodiment of the present invention can be provided for use in, for example, a window glass of a vehicle such as an automobile or a train, a window glass of a building, or a glass of a door of a storage furniture.

In addition, in a case where the optical film is provided in a window glass of a vehicle such as an automobile or a train or a window glass of a building, a projector that projects an image to the optical film can be provided for use in the vehicle or the building.

Hereinabove, the optical film according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Preparation of Transparent Screen 01)

A composition shown below was stirred and mixed in a container and was filtered through a polypropylene filter having a pore size of 30 μm. As a result, a resin layer-forming solution 1 was prepared.

| -Resin Layer-Forming Solution 1- | |
|---|---|
| Ultraviolet curable resin: pentaerythritol triacrylate (trade name: PET-30, manufactured by Nippon Kayaku Co., Ltd., refractive index: 1.53) | 19.1 parts by mass |
| Ultraviolet curable resin: ViSCOAT 360 (manufactured by Osaka Organic Chemical Industry Ltd., refractive index: 1.50) | 19.1 parts by mass |
| Photocuring initiator: IRGACURE 127 (manufactured by BASF SE) | 1.5 parts by mass |
| First particles: crosslinked acryl-styrene beads (manufactured by Soken Chemical & Engineering Co., Ltd., particle size: 8 μm, refractive index: 1.555) | 6.0 parts by mass |
| Second particles: crosslinked acryl beads (manufactured by Soken Chemical & Engineering Co., Ltd., particle size: 8 μm, refractive index: 1.50) | 6.0 parts by mass |
| Viscosity adjuster: cellulose acetate butyrate | 3.6 parts by mass |
| Fluorine surfactant | 1.1 parts by mass |
| Solvent: methyl isobutyl ketone | 17.1 parts by mass |
| Solvent: methyl ethyl ketone | 14.7 parts by mass |

A triacetyl cellulose film (trade name: TD80U, manufactured by Fuji Film Co., Ltd.) having a thickness of 80 μm was unwound from a roll, and the resin layer-forming solution 1 prepared as described above was applied thereto and dried such that the dry film thickness was 15 μm. After drying the solvent, the coating film was irradiated with ultraviolet light at 100 mJ/cm² in a nitrogen atmosphere to be cured. As a result a resin layer was formed.

Next, the triacetyl cellulose film (TD80U, manufactured by Fuji Film Co., Ltd.) was bonded to the formed resin layer using a pressure sensitive adhesive (SK2057, manufactured by Soken Chemical & Engineering Co., Ltd.). As a result, a transparent screen 01 was prepared.

In the prepared transparent screen 01, a light amount $T_{15}$ of transmitted light at an angle of 15 degrees with respect to a normal direction of a main surface, a light amount $T_{30}$ of transmitted light at an angle of 30 degrees with respect to the normal direction of the main surface, a light amount $R_{15}$ of reflected light at an angle of 15 degrees with respect to the normal direction of the main surface, and a light amount $R_{30}$ of reflected light at an angle of 30 degrees with respect to the normal direction of the main surface were measured using a goniophotometer (GP-200, manufactured by Murakami Color Research Laboratory Co., Ltd.).

The light amount $T_{15}$ of transmitted light at an angle of 15 degrees was 0.77, the light amount $T_{30}$ of transmitted light at an angle of 30 degrees was 0.043, the light amount $R_{15}$ of reflected light at an angle of 15 degrees was 0.00037, and the light amount $R_{30}$ of reflected light at an angle of 30 degrees was 0.0003.

That is, a light amount ratio $T_{15}/T_{30}$ was 18, and a light amount ratio $R_{15}/R_{30}$ was 1.2.

In addition, the haze value of the transparent screen 01 was 12% in case of being measured.

(Preparation of Optical Film)

A half mirror (manufactured by Kodama Glass) as a transparent reflecting layer 01 was bonded to one surface of the prepared transparent screen 01 using a pressure sensitive adhesive (SK2057, manufactured by Soken Chemical & Engineering Co., Ltd.). The reflectivity of the transparent reflecting layer 01 was 45%, and the transmittance thereof was 55%. For the measurement, a spectrophotometer UV3150 (manufactured by JASCO Corporation) was used.

Example 2

A transparent screen 02 and an optical film were prepared using the same method as that of Example 1, except that the following resin layer-forming solution 2 was used instead of the resin layer-forming solution 1.

—Resin Layer-Forming Solution 2—

A resin layer-forming solution 2 was prepared using the same method as that of the resin layer-forming solution 1, except that 1.0 part by mass of acryl-styrene beads (manufactured by Sekisui Plastics Co., Ltd., particle size: 6 μm, refractive index: 1.59) were used as the first particles.

In the prepared transparent screen 02, a light amount $T_{15}$ of transmitted light at an angle of 15 degrees with respect to a normal direction of a main surface, a light amount $T_{30}$ of transmitted light at an angle of 30 degrees with respect to the normal direction of the main surface, a light amount $R_{15}$ of reflected light at an angle of 15 degrees with respect to the normal direction of the main surface, and a light amount $R_{30}$ of reflected light at an angle of 30 degrees with respect to the normal direction of the main surface were measured using a goniophotometer (GP-200, manufactured by Murakami Color Research Laboratory Co., Ltd.).

The light amount $T_{15}$ of transmitted light at an angle of 15 degrees was 0.6, the light amount $T_{30}$ of transmitted light at an angle of 30 degrees was 0.035, the light amount $R_{15}$ of reflected light at an angle of 15 degrees was 0.00072, and the light amount $R_{30}$ of reflected light at an angle of 30 degrees was 0.00058.

That is, a light amount ratio $T_{15}/T_{30}$ was 17, and a light amount ratio $R_{15}/R_{30}$ was 1.2. In addition, the haze value of the transparent screen 02 was 14% in case of being measured.

Example 3

A transparent screen 03 and an optical film were prepared using the same method as that of Example 1, except that the following resin layer-forming solution 3 was used instead of the resin layer-forming solution 1.

—Resin Layer-Forming Solution 3—

A resin layer-forming solution 3 in which zirconia (particle size: 0.5 μm, refractive index: 2.2) was dispersed was prepared with reference to WO2009/088043A.

In the prepared transparent screen 03, a light amount $T_{15}$ of transmitted light at an angle of 15 degrees with respect to a normal direction of a main surface, a light amount $T_{30}$ of transmitted light at an angle of 30 degrees with respect to the normal direction of the main surface, a light amount $R_{15}$ of reflected light at an angle of 15 degrees with respect to the normal direction of the main surface, and a light amount $R_{30}$ of reflected light at an angle of 30 degrees with respect to the normal direction of the main surface were measured using a goniophotometer (GP-200, manufactured by Murakami Color Research Laboratory Co., Ltd.).

The light amount $T_{15}$ of transmitted light at an angle of 15 degrees was 1.036, the light amount $T_{30}$ of transmitted light at an angle of 30 degrees was 0.274, the light amount $R_{15}$ of reflected light at an angle of 15 degrees was 0.029, and the light amount $R_{30}$ of reflected light at an angle of 30 degrees was 0.0188.

That is, a light amount ratio $T_{15}/T_{30}$ was 3.8, and a light amount ratio $R_{15}/R_{30}$ was 1.5.

In addition, the haze value of the transparent screen 03 was 17% in case of being measured.

Example 4

An optical film was prepared using the same method as that of Example 1, except that the following transparent screen 04 was used instead of the transparent screen 01.

(Preparation of Underlayer)

A composition shown below was stirred and dissolved in a container held at 25° C. to prepare an underlayer-forming solution.

| Underlayer-Forming Solution (part(s) by mass) | |
| --- | --- |
| Propylene glycol monomethyl ether acetate | 67.8 |
| MEGAFACE RS-90 (manufactured by DIC Corporation) | 31.7 |
| IRGACURE 819 (manufactured by BASF SE) | 0.5 |

The underlayer-forming solution prepared as described above was applied to a transparent polyethylene terephthalate (PET; COSMOSHINE A4100, manufactured by Toyobo Co., Ltd.) substrate having a thickness of 100 μm using a bar coater in an application amount of 3 mL/m². Next, the underlayer-forming solution was heated such that the film surface temperature was 90° C., and then was dried for 120 seconds. Next, in a nitrogen purged atmosphere having an oxygen concentration of 100 ppm or lower, 300 mJ/cm² of ultraviolet light was irradiated using an ultraviolet irradiation device to promote a crosslinking reaction. As a result, an underlayer was prepared.

(Formation of Cholesteric Liquid Crystal Dot)

A composition shown below was stirred and dissolved in a container held at 25° C. to prepare a cholesteric liquid crystal ink solution Gm (liquid crystal composition).

| Cholesteric Liquid Crystal Ink Solution Gm (part(s) by mass) | |
| --- | --- |
| Methoxyethyl acrylate: | 145.0 |
| A mixture of rod-shaped liquid crystal compounds having the following structures: | 100.0 |
| IRGACURE 819 (manufactured by BASF SE) | 10.0 |
| Chiral agent A having the following structure | 5.78 |
| Surfactant having the following structure | 0.08 |

Rod-Shaped Liquid Crystal Compounds

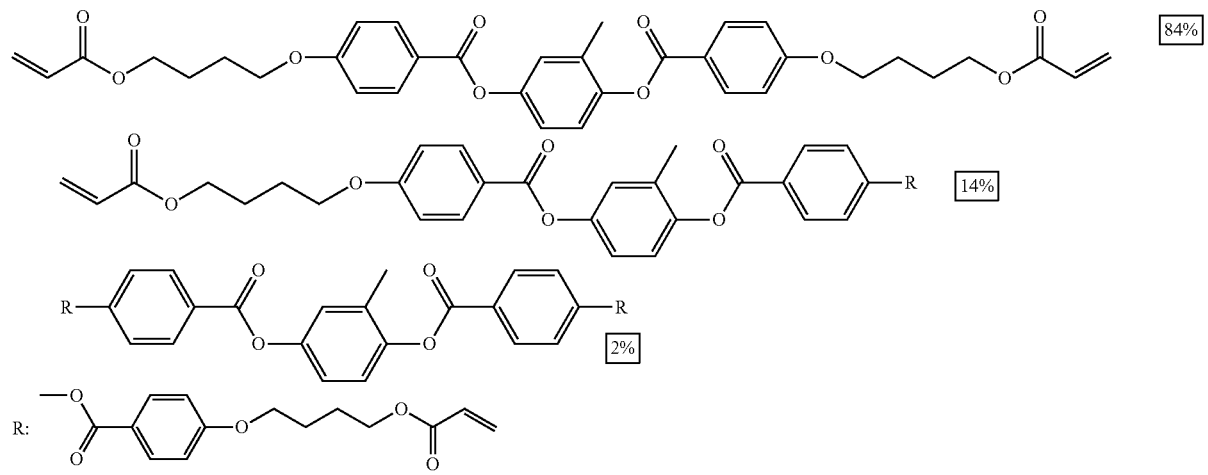

Numerical values are represented by mass %. In addition, R represents a group to be bonded to an oxygen atom.

Chiral Agent A

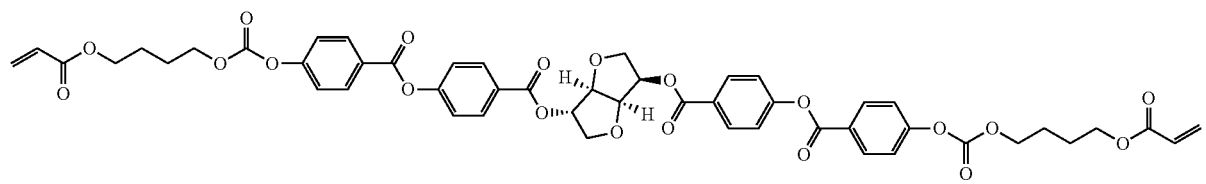 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Surfactant

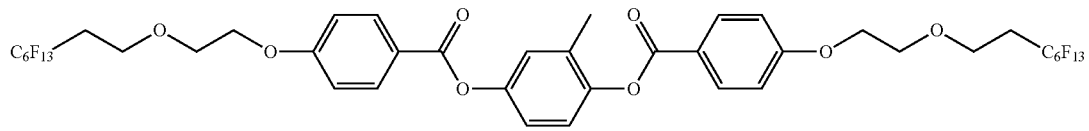

The cholesteric liquid crystal ink solution Gm is a material for forming dots that reflect light having a center wavelength of 550 nm. In addition, the cholesteric liquid crystal ink solution Gm is a material for forming dots that reflect right circularly polarized light. That is, the cholesteric liquid crystal ink solution Gm is a material for forming the right polarized light green dots.

The cholesteric liquid crystal ink solution Gm was applied to the entire 100×100 mm region of the underlayer of the PET prepared as described above using an ink jet printer (DMP-2831, manufactured by Fujifilm Dimatix Inc.) such that the distance (pitch) between dot centers was 60 µm. Next, the cholesteric liquid crystal ink solution Gm was dried at 95° C. for 30 seconds and was irradiated with 500 mJ/cm$^2$ of ultraviolet light at room temperature to be cured using an ultraviolet irradiation device. As a result, dots were formed.

(Dot Shape)

Among the formed dots, any 10 dots were selected, and the shapes of the dots were observed using a laser microscope (manufactured by Keyence Corporation). The average diameter of the dots was 30 µm, the average maximum height was 8 µm, an average angle (contact angle) at a contact portion between a dot surface of a dot end portion and an underlayer surface was 42 degrees, and the height was continuously increased in a direction from the dot end portion to the center.

(Dot Area Ratio)

Among the formed dots, any 10 dots were selected, and the shapes of the dots were observed using a laser microscope (manufactured by Keyence Corporation), and area ratios at five positions in a region having a size of 1 mm×1 mm were measured. The average value of the area ratios was 19.6%.

(Formation of Overcoat Layer)

A composition shown below was stirred and dissolved in a container held at 25° C. to prepare an overcoat layer-forming coating solution 1.

| Overcoat Layer-Forming Coating Solution 1 (part(s) by mass) | |
|---|---|
| Acetone | 100.0 |
| KAYARAD DPCA-30 (manufactured by Nippon Kayaku Co., Ltd.) | 30.0 |

-continued

| Overcoat Layer-Forming Coating Solution 1 (part(s) by mass) | |
|---|---|
| EA-200 (manufactured by Osaka Gas Chemicals Co., Ltd.) | 70.0 |
| IRGACURE 819 (manufactured by BASF SE) | 3.0 |

The overcoat layer-forming coating solution 1 prepared as described above was applied to the underlayer, where the cholesteric liquid crystal dot was formed, using a bar coater in an application amount of 40 mL/m². Next, the overcoat layer-forming coating solution was heated such that the film surface temperature was 50° C., and then was dried for 60 seconds. Next, 500 mJ/cm² of ultraviolet light was irradiated using an ultraviolet irradiation device to promote a crosslinking reaction. As a result, an overcoat layer was formed, and a Gm dot film was prepared.

Next, a Bm dot film and a Rm dot film were prepared using the same method, except that cholesteric liquid crystal ink solutions Bm and Rm having different amounts of the chiral agent A were used. The cholesteric liquid crystal ink solutions Bm and RM are materials for forming dots that reflect light having a center wavelength of 450 nm light having a center wavelength of 650 nm, respectively. The three films were laminated using a pressure sensitive adhesive (manufactured by Soken Chemical & Engineering Co., Ltd.) to obtain a transparent screen 04.

In the prepared transparent screen 04, a light amount $T_{15}$ of transmitted light at an angle of 15 degrees with respect to a normal direction of a main surface, a light amount $T_{30}$ of transmitted light at an angle of 30 degrees with respect to the normal direction of the main surface, a light amount $R_{15}$ of reflected light at an angle of 15 degrees with respect to the normal direction of the main surface, and a light amount $R_{30}$ of reflected light at an angle of 30 degrees with respect to the normal direction of the main surface were measured using a goniophotometer (GP-200, manufactured by Murakami Color Research Laboratory Co., Ltd.).

The light amount $T_{15}$ of transmitted light at an angle of 15 degrees was 1.0, the light amount $T_{30}$ of transmitted light at an angle of 30 degrees was 0.05, the light amount $R_{15}$ of reflected light at an angle of 15 degrees was 0.035, and the light amount $R_{30}$ of reflected light at an angle of 30 degrees was 0.0292.

That is, a light amount ratio $T_{15}/T_{30}$ was 20, and a light amount ratio $R_{15}/R_{30}$ was 1.2.

In addition, the haze value of the transparent screen 04 was 5% in case of being measured.

Examples 5 to 8

Optical films were prepared using the same methods as those of Examples 1 to 4, except that the following transparent reflecting layer 02 was used instead of the transparent reflecting layer 01.

(Transparent Reflecting Layer 02)

A transparent PET film (COSMOSHINE A4100, manufactured by Toyobo Co., Ltd.) having a thickness of 75 μm that was rubbed in a longitudinal direction was prepared. The cholesteric liquid crystal ink solution Gm was applied to the surface of the PET film using a bar coater #8. Next, the coating film was heated such that the coating film surface temperature was 60° C., and then was dried for 120 seconds. Next, the coating film was irradiated with ultraviolet light at 500 mJ/cm² using an ultraviolet irradiation device to promote a crosslinking reaction. As a result, a green reflecting optical film was prepared.

A blue reflecting optical film and a red reflecting optical film were prepared using the same method, except that the cholesteric liquid crystal ink solutions Bm and Rm were used. The three films were laminated using a pressure sensitive adhesive (manufactured by Soken Chemical & Engineering Co., Ltd.) to prepare a transparent reflecting layer 02.

The reflectivity of the transparent reflecting layer 02 was 45%, and the transmittance thereof was 55%.

Examples 9 to 12

Optical films were prepared using the same methods as those of Examples 1 to 4, except that the following transparent reflecting layer 03 was used instead of the transparent reflecting layer 01.

(Transparent Reflecting Layer 03)

As the transparent reflecting layer 03, a dielectric multilayer film (H256, manufactured by Shibuya Optical Co., Ltd.) was used.

The reflectivity of the transparent reflecting layer 03 was 45%, and the transmittance thereof was 55%.

Examples 13 to 16

Optical films were prepared using the same methods as those of Examples 1 to 4, except that the following transparent reflecting layer 04 was used instead of the transparent reflecting layer 01.

(Transparent Reflecting Layer 04)

As the transparent reflecting layer 04, a wire grid polarizing film (manufactured by Shibuya Optical Co., Ltd.) was used.

The reflectivity of the transparent reflecting layer 04 was 45%, and the transmittance thereof was 55%.

Comparative Examples 1 to 4

Optical films were prepared using the same methods as those of Examples 1 to 4, except that the transparent reflecting layer was not provided. That is, the transparent screens were the optical films.

Comparative Example 5

A transparent screen 05 and an optical film were prepared using the same method as that of Example 1, except that the following resin layer-forming solution 5 was used instead of the resin layer-forming solution 1.

—Resin Layer-Forming Solution 5—

A resin layer-forming solution 5 in which zirconia (particle size: 0.05 μm, refractive index: 2.2) was dispersed was prepared with reference to WO2009/088043A.

In the prepared transparent screen 05, a light amount $T_{15}$ of transmitted light at an angle of 15 degrees with respect to a normal direction of a main surface, a light amount $T_{30}$ of transmitted light at an angle of 30 degrees with respect to the normal direction of the main surface, a light amount $R_{15}$ of reflected light at an angle of 15 degrees with respect to the normal direction of the main surface, and a light amount $R_{30}$ of reflected light at an angle of 30 degrees with respect to the normal direction of the main surface were measured using a goniophotometer (GP-200, manufactured by Murakami Color Research Laboratory Co., Ltd.).

The light amount $T_{15}$ of transmitted light at an angle of 15 degrees was 0.132, the light amount $T_{30}$ of transmitted light at an angle of 30 degrees was 0.128, the light amount $R_{15}$ of reflected light at an angle of 15 degrees was 0.109, and the light amount $R_{30}$ of reflected light at an angle of 30 degrees was 0.104.

That is, a light amount ratio $T_{15}/T_{30}$ was 1.03, and a light amount ratio $R_{15}/R_{30}$ was 1.05.

In addition, the haze value of the transparent screen 05 was 7% in case of being measured.

Examples 17 to 20

<Preparation of λ/4 Plate>

A λ/4 plate was prepared by forming an optically-anisotropic layer on the protective film 01 with the aligned film with reference to Examples (paragraphs "0272" to "0282") described in JP2012-18396A. Re (550) and Rth (550) were 138 nm and 5 nm, respectively.

In Examples 17 to 20, the prepared λ/4 plate was bonded to surfaces of the transparent reflecting layers 02 according to Examples 5 to 8 opposite to the transparent screen.

<Evaluation>

Regarding each of the prepared optical films according to Examples and Comparative Examples, the contrast was evaluated in a bright room environment where external light was present.

(Evaluation of Contrast)

In the evaluation of the contrast, the optical film was put in a bright room environment where external light was present, a brightness (Yw+Ys) of the center portion of the optical film in a case where a white image was projected and a brightness (Yb+Ys) of the center portion of the optical film in a case where a black image was projected were measured, respectively. The contrast was calculated based on a ratio (Yw+Ys)/(Yb+Ys) of the brightness (Yw+Ys) to the brightness (Yb+Ys).

In addition, in a case where an image was not projected, that is, in a case where only external light was present, the brightness Ys of the center portion of the optical film was 100 $[cd/m^2]$ in case of being measured using a luminance meter (luminance colorimeter BM-5A, manufactured by Topcon Technohouse Corporation).

The brightness in a case where a white image was projected was measured by disposing a projector (EB-G6250W, manufactured by Seiko Epson Corporation) at a position which passed through the front surface of the optical film and the center of the optical film and was at a distance of 1.0 m in the normal direction, projecting an image whose entire surface was white, and disposing a luminance meter (luminance colorimeter BM-5A, manufactured by Topcon Technohouse Corporation) at a position which passed through the front surface of the optical film and the center of the optical film and was at a distance of 1.5 m in the normal direction.

Likewise, the brightness in a case where a black image was projected was measured by projecting an image whose entire surface was black from the projector.

Regarding each of the transparent screens, the light amounts $T_{15}$ and $T_{30}$ of transmitted light, the light amounts $R_{15}$ and $R_{30}$ of reflected light, the light amount ratios $T_{15}/T_{30}$ and $R_{15}/R_{30}$, and the haze value are shown in Table 1. In addition, the evaluation results of the contrast are shown in Tables 2 and 3.

TABLE 1

|  | $T_{15}$ | $T_{30}$ | $T_{15}/T_{30}$ | $R_{15}$ | $R_{30}$ | $R_{15}/R_{30}$ | [%] |
|---|---|---|---|---|---|---|---|
| Transparent Screen 01 | 0.77 | 0.043 | 18 | 0.00037 | 0.0003 | 1.2 | 12 |
| Transparent Screen 02 | 0.6 | 0.035 | 17 | 0.00072 | 0.00058 | 1.2 | 14 |
| Transparent Screen 03 | 1.036 | 0.274 | 3.8 | 0.029 | 0.0188 | 1.5 | 17 |
| Transparent Screen 04 | 1.0 | 0.05 | 20 | 0.035 | 0.0292 | 1.2 | 5 |
| Transparent Screen 05 | 0.132 | 0.128 | 1.03 | 0.109 | 0.104 | 1.05 | 7 |

TABLE 2

|  | Transparent Screen | Transparent Reflecting Layer | Contrast |
|---|---|---|---|
| Example 1 | Transparent Screen 01 | Transparent Reflecting Layer 01 | 28 |
| Example 2 | Transparent Screen 02 | Transparent Reflecting Layer 01 | 26 |
| Example 3 | Transparent Screen 03 | Transparent Reflecting Layer 01 | 30 |
| Example 4 | Transparent Screen 04 | Transparent Reflecting Layer 01 | 31 |
| Example 5 | Transparent Screen 01 | Transparent Reflecting Layer 02 | 26 |
| Example 6 | Transparent Screen 02 | Transparent Reflecting Layer 02 | 27 |
| Example 7 | Transparent Screen 03 | Transparent Reflecting Layer 02 | 29 |
| Example 8 | Transparent Screen 04 | Transparent Reflecting Layer 02 | 30 |
| Example 9 | Transparent Screen 01 | Transparent Reflecting Layer 03 | 27 |
| Example 10 | Transparent Screen 02 | Transparent Reflecting Layer 03 | 26 |
| Example 11 | Transparent Screen 03 | Transparent Reflecting Layer 03 | 30 |
| Example 12 | Transparent Screen 04 | Transparent Reflecting Layer 03 | 31 |
| Example 13 | Transparent Screen 01 | Transparent Reflecting Layer 04 | 31 |
| Example 14 | Transparent Screen 02 | Transparent Reflecting Layer 04 | 30 |
| Example 15 | Transparent Screen 03 | Transparent Reflecting Layer 04 | 34 |
| Example 16 | Transparent Screen 04 | Transparent Reflecting Layer 04 | 35 |
| Comparative Example 1 | Transparent Screen 01 | (None) | 13 |
| Comparative Example 2 | Transparent Screen 02 | (None) | 12 |
| Comparative Example 3 | Transparent Screen 03 | (None) | 16 |
| Comparative Example 4 | Transparent Screen 04 | (None) | 20 |
| Comparative Example 5 | Transparent Screen 05 | Transparent Reflecting Layer 01 | 14 |

TABLE 3

| | Transparent Screen | Transparent Reflecting Layer | Contrast |
|---|---|---|---|
| Example 17 | Transparent Screen 01 | Transparent Reflecting Layer 02 with λ/4 plate | 30 |
| Example 18 | Transparent Screen 02 | Transparent Reflecting Layer 02 with λ/4 plate | 32 |
| Example 19 | Transparent Screen 03 | Transparent Reflecting Layer 02 with λ/4 plate | 33 |
| Example 20 | Transparent Screen 04 | Transparent Reflecting Layer 02 with λ/4 plate | 35 |

As shown in Tables 2 and 3, in the optical films according to Examples of the present invention, the contrast was higher than that of Comparative Examples.

As can be seen from the above results, the effects of the present invention are obvious.

EXPLANATION OF REFERENCES 10a, 10b: optical film
11a, 11b: transparent screen
12: substrate
14: transparent reflecting layer
16: overcoat layer
20: liquid crystal dot
22: resin layer
24: resin binder
26: particle

What is claimed is:

1. An optical film comprising:
a transparent screen; and
a transparent reflecting layer that is disposed on one main surface of the transparent screen,
wherein in the transparent screen, a ratio $T_{15}/T_{30}$ of a light amount $T_{15}$ of transmitted light at an angle of 15 degrees with respect to a normal direction of the main surface to a light amount $T_{30}$ of transmitted light at an angle of 30 degrees with respect to the normal direction of the main surface is 2.0 or higher, and
a ratio $R_{15}/R_{30}$ of a light amount $R_{15}$ of reflected light at an angle of 15 degrees with respect to the normal direction of the main surface to a light amount $R_{30}$ of reflected light at an angle of 30 degrees with respect to the normal direction of the main surface is 2.0 or lower, and
wherein the transparent reflecting layer includes any one of a cholesteric liquid crystal layer, a dielectric multi-layer film, a wire grid polarizing plate, and a half mirror.

2. The optical film according to claim 1,
wherein the transparent reflecting layer includes the cholesteric liquid crystal layer, and the transparent reflecting layer includes a λ/4 plate.

3. The optical film according to claim 1,
wherein the transparent reflecting layer is formed of the dielectric multi-layer film, and the dielectric multi-layer film has linear polarization properties.

4. The optical film according to claim 1,
wherein a reflectivity of the transparent reflecting layer is 20% to 50%.

5. The optical film according to claim 1,
wherein the transparent screen includes a plurality of cholesteric liquid crystal dots.

6. The optical film according to claim 1,
wherein the transparent screen includes a resin layer in which a plurality of particles are dispersed in a resin binder,
a particle size of the particles is 0.3 μm to 10 μm, and
a volume fraction of a content of the particles in the resin layer is 50% or lower.

7. The optical film according to claim 1,
wherein a ratio of a refractive index of the particles to a refractive index of the resin binder is 0.91 to 1.5.

8. The optical film according to claim 1, which is laminated on at least a part of a window glass of a vehicle.

9. The optical film according to claim 8, which reflects light emitted from a projector provided in the vehicle.

* * * * *